United States Patent
Li et al.

(10) Patent No.: US 11,589,047 B2
(45) Date of Patent: Feb. 21, 2023

(54) VIDEO ENCODING AND DECODING METHODS AND APPARATUS

(71) Applicant: ZTE Corporation, Guangdong (CN)

(72) Inventors: Ming Li, Guangdong (CN); Ping Wu, Guangdong (CN); Zhao Wu, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/214,520

(22) Filed: Mar. 26, 2021

(65) Prior Publication Data

US 2021/0218965 A1     Jul. 15, 2021

Related U.S. Application Data

(63) Continuation of application No. PCT/CN2018/108244, filed on Sep. 28, 2018.

(51) Int. Cl.
| | |
|---|---|
| *H04N 19/119* | (2014.01) |
| *H04N 19/124* | (2014.01) |
| *H04N 19/174* | (2014.01) |
| *H04N 19/436* | (2014.01) |
| *H04N 19/70* | (2014.01) |

(52) U.S. Cl.
CPC ......... *H04N 19/119* (2014.11); *H04N 19/124* (2014.11); *H04N 19/174* (2014.11); *H04N 19/436* (2014.11); *H04N 19/70* (2014.11)

(58) Field of Classification Search
CPC .. H04N 19/119; H04N 19/124; H04N 19/174; H04N 19/436; H04N 19/70; H04N 19/184; H04N 19/129; H04N 19/176
See application file for complete search history.

(56) References Cited

U.S. PATENT DOCUMENTS

| | | |
|---|---|---|
| 2007/0257926 A1 | 11/2007 | Deb |
| 2014/0334557 A1 | 11/2014 | Schierl et al. |
| | (Continued) | |

FOREIGN PATENT DOCUMENTS

| | | |
|---|---|---|
| CN | 104170378 A | 11/2014 |
| CN | 104205834 A | 12/2014 |
| | (Continued) | |

OTHER PUBLICATIONS

International Search Report and Written Opinion in International Application No. PCT/CN2018/108244, dated Jun. 6, 2019, 8 pages.

(Continued)

*Primary Examiner* — Tat C Chio
(74) *Attorney, Agent, or Firm* — Perkins Coie LLP

(57) ABSTRACT

Techniques for encoding, decoding, and extracting one or more bitstreams to form one or more sub-bitstreams are described. In one example aspect, a method for video or picture processing includes partitioning a picture into one or more tiles and generating one or more bitstreams using one or more configurations based on the one or more tiles. Generating each of the one or more bitstreams includes partitioning each of the one or more tiles into one or more slices, and performing, for each slice among the one or more slices a first encoding step to encode a tile identifier in a header of the slice, and a second encoding step to encode, in the header of the slice, a second address of the slice that indicates a location of the slice in the tile.

20 Claims, 18 Drawing Sheets

(56) References Cited

U.S. PATENT DOCUMENTS

| | | | |
|---|---|---|---|
| 2014/0341478 A1 | 11/2014 | Sasai et al. | |
| 2021/0204000 A1* | 7/2021 | Wang | H04N 19/436 |

FOREIGN PATENT DOCUMENTS

| | | | | |
|---|---|---|---|---|
| CN | 104902343 A | 9/2015 | | |
| CN | 108156478 A | 6/2018 | | |
| JP | 2013141094 A | 7/2013 | | |
| JP | 2021-512534 A | 5/2021 | | |
| WO | 2019145262 A1 | 8/2019 | | |
| WO | WO-2019145262 A1 * | 8/2019 | | H04L 65/601 |
| WO | 2020008103 A1 | 1/2020 | | |

OTHER PUBLICATIONS

Co-Pending Chinese Patent Application No. 2018800995656, dated Jan. 21, 2022, 14 pages (with unofficial translation).

Extended European Search Report in EP Patent Application No. 18930446.2, dated Aug. 25, 2021, 9 pages.

Skupin (Fraunhofer) R et al: "AHG 12: Sub-bitstream extraction/merging friendly slice address signalling", 124. MPEG Meeting; Oct. 8, 2018-Oct. 12, 2018; Macao; (Motion Picture Expert Group or ISO/IEC JTC1/SC29/WG11), No. m44247 Sep. 25, 2018 (Sep. 25, 2018), XP030190967, Retrieved from the Internet: URL:http://phenix.int-evry.fr/mpeg/doc end user/documents/124 Macao/wgll/m44247-JVET~L0227-vl-JVET-L0227.zip JVET-L0227.docx [retrieved on Sep. 25, 2018].

Bross Bet al: "Versatile Video Coding (Draft 2)", 11. JVET Meeting; Jul. 11, 2018-Jul. 18, 2018; Ljubljana; (The Joint Video Exploration Team of ISO/IEC JTC1/SC29/WG11 and ITU-TSG. 16 ). No. JVET-K1001 Sep. 21, 2018 (Sep. 21, 2018), XP030193577, Retrieved from the Internet: URL:http://phenix.int-evry.fr/jvet/doc end user/documents/11 Ljubljana/wgll/JVET~K10 01-v6.zip JVET-K1001-v6.docx [retrieved on Sep. 21, 2018].

Kiran Misra et al: "An Overview of Tiles in HEVC", IEEE Journal of Selected Topics in Signal Processing, vol. 7, No. 6, Dec. 1, 2013 (Dec. 1, 2013), pp. 969-977, XP055257475, us ISSN: 1932-4553, DOI: 10.1109/JSTSP.2013.2271451.

Ghaznavi-Youvalari Ramin et al: "Comparison of HEVC coding schemes for tile-based viewport-adaptive streaming of omnidirectional video", 2017 IEEE 19th International Workshop on Multimedia Signal Processing (MMSP), IEEE, Oct. 16, 2017 (Oct. 16, 2017), pp. 1-6, XP033271559, DOI: 10.1109/MMSP.2017.8122227 [retrieved on Nov. 27, 2017].

Co-Pending Japanese Patent Application No. 2021-517692, dated Jul. 1, 2022, 7 pages (with unofficial translation).

* cited by examiner

| 4100 | 4110 | | | | 4120 | | | | 4130 | | | |
|------|------|-------|-------|-------|------|-------|-------|-------|------|-------|-------|-------|
| | 41000 | 41100 | | | 41200 | | | | 41300 | | | |
| | 41001 | 41101 | | | 41201 | | | | 41301 | | | |
| | 41002 | 41102 | | | 41202 | | | | 41302 | | | |
| | 41003 | 41103 | | | 41203 | | | | 41303 | | | |
| 4140 | 4150 | | | | 4160 | | | | 4170 | | | |
| | 41400 | 41500 | | | 41600 | | | | 41700 | | | |
| | 41401 | 41501 | | | 41601 | | | | 41701 | | | |
| | 41402 | 41502 | | | 41602 | | | | 41702 | | | |
| | 41403 | 41503 | | | 41603 | | | | 41703 | | | |

| | Descriptor |
|---|---|
| tiles_enable_flag | u(1) |

FIG. 5A

| | Descriptor |
|---|---|
| if( tiles_enable_flag ) { | |
|   tile_partitioning( ) | |
| } | |

FIG. 5B

| | Descriptor |
|---|---|
| if( tiles_enable_flag ) { | |
|   tile_ids( ) | |
| } | |

FIG. 5C

| | Descriptor |
|---|---|
| if( tiles_enable_flag ) { | |
|   tile_partitioning( ) | |
|   tile_ids( ) | |
| } | |

FIG. 5D

| | Descriptor |
|---|---|
| tiles_enable_flag | u(1) |
| if( tiles_enable_flag ) { | |
|   tile_partitioning( ) | |
|   tile_ids( ) | |
| } | |

FIG. 5E

| tile_partitioning( ) { | Descriptor |
|---|---|
| num_tile_columns_minus1 | ue(v) |
| num_tile_rows_minus1 | ue(v) |
| uniform_spacing_flag | u(1) |
| if( !uniform_spacing_flag ) { | |
| for( i = 0; i < num_tile_columns_minus1; i++ ) | |
| column_width_minus1[ i ] | ue(v) |
| for( i = 0; i < num_tile_rows_minus1; i++ ) | |
| row_height_minus1[ i ] | ue(v) |
| } | |
| } | |

FIG. 5F

| tile_ids( ) { | Descriptor |
|---|---|
| tile_id_present_flag | u(1) |
| if (tile_id_present_flag ) { | |
| tile_id_ascending_flag | u(1) |
| if (tile_id_ascending_flag) | |
| tile_id_starting_value | ue(v) |
| else | |
| for( i = 0; i < numTilesInPic; i++ ) | |
| tile_id[ i ] | ue(v) |
| } | |
| } | |

FIG. 5G

| | Descriptor |
|---|---|
| slice_tile_id | ue(v) |
| ...... | |
| slice_address | ue(v) |

FIG. 6A

| | Descriptor |
|---|---|
| slice_tile_id | ue(v) |
| ...... | |
| first_slice_in_tile_flag | u(1) |
| ...... | |
| if ( ! first_slice_in_tile_flag ) | |
| slice_address | ue(v) |

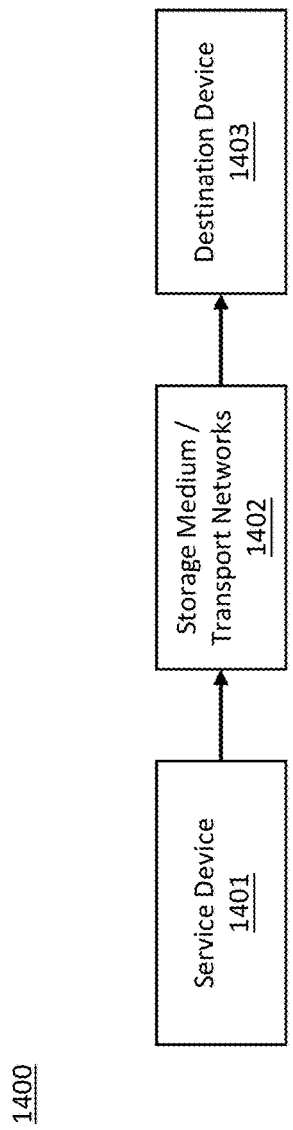
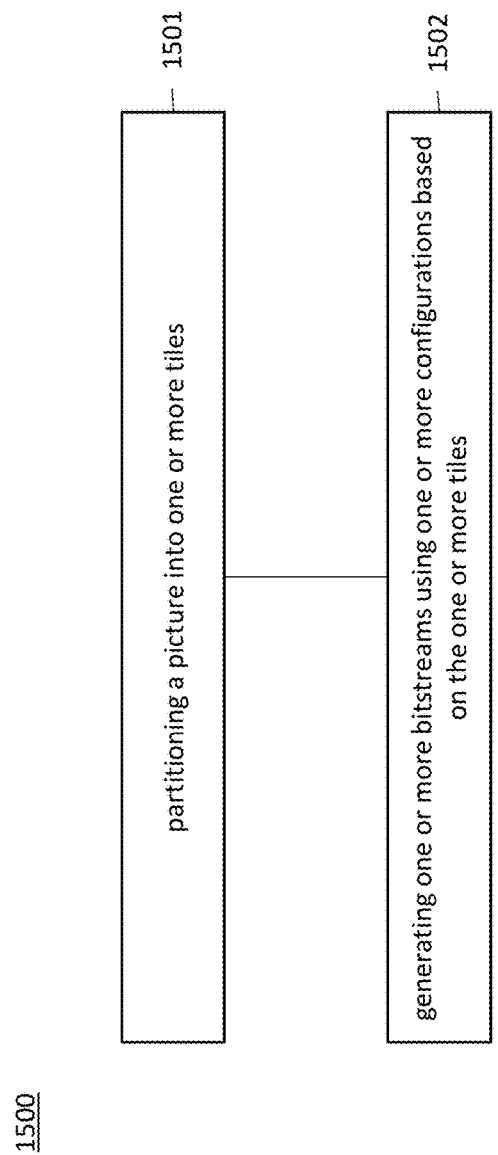

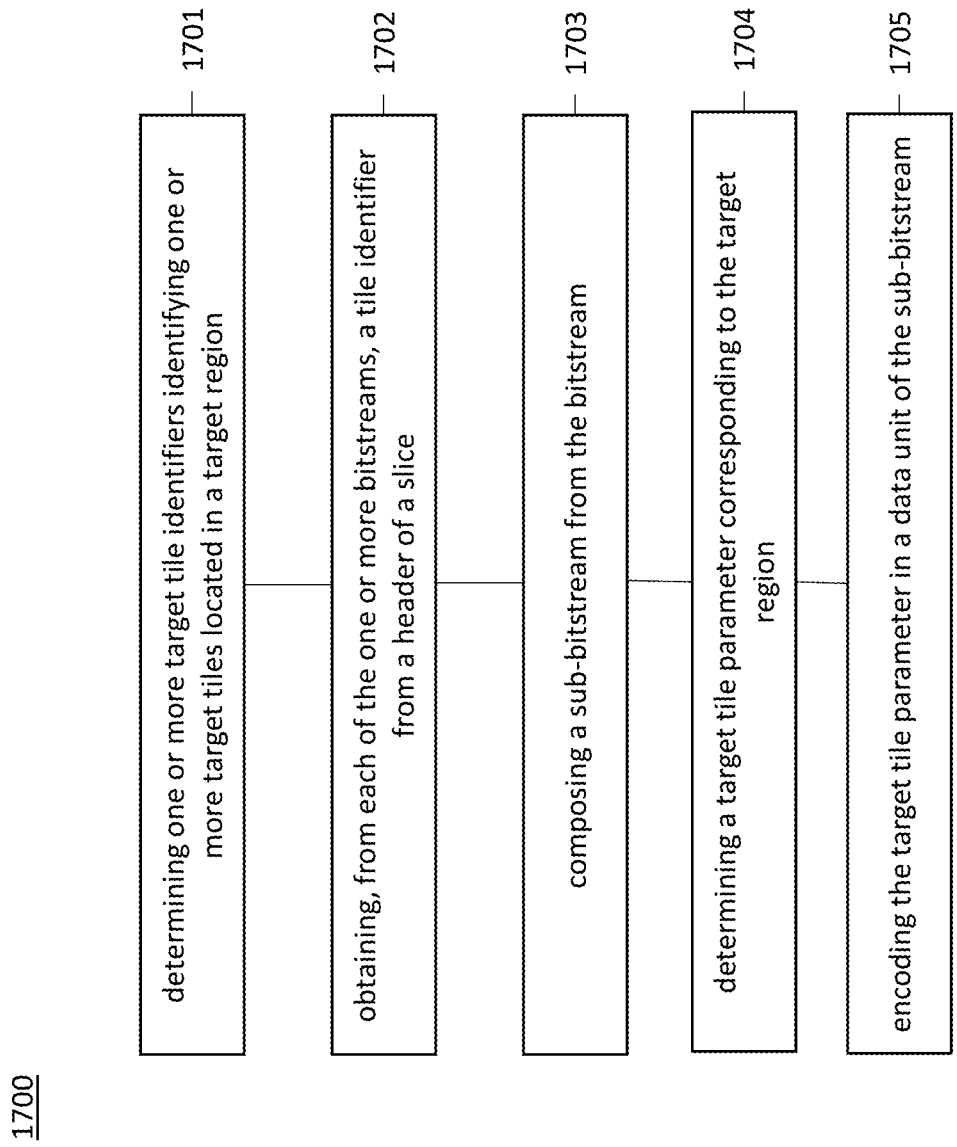

VIDEO ENCODING AND DECODING METHODS AND APPARATUS

CROSS-REFERENCE TO RELATED APPLICATIONS

This application is a continuation of International Patent Application No. PCT/CN2018/108244, filed on Sep. 28, 2018, the contents of which are incorporated herein by reference in their entirety.

TECHNICAL FIELD

This patent document is directed generally to video processing and communication.

BACKGROUND

As video processing techniques advance, partitioning a video or a picture into regions is often desirable to facilitate resynchronization, parallel processing, region-of-interest coding and streaming, packetized transmission, and/or viewport dependent streaming. There exists a need to improve the existing partitioning methods to allow more efficient access to the regions of interest within the picture.

SUMMARY

This patent document describes, among other things, techniques for encoding a digital video or picture to generate one or more bitstreams, decoding a bitstream to reconstruct a digital video or picture, and extracting one or more bitstreams to form one or more sub-bitstreams.

In one example aspect, a method for video or picture processing is disclosed. The method includes partitioning a picture into one or more tiles and generating one or more bitstreams using one or more configurations based on the one or more tiles. Generating each of the one or more bitstreams includes partitioning each of the one or more tiles into one or more slices, and performing, for each slice among the one or more slices a first encoding step to encode a tile identifier in a header of the slice, and a second encoding step to encode, in the header of the slice, a second address of the slice that indicates a location of the slice in the tile. The tile identifier indicates a tile in which the slice resides. The second address is determined based on a first address of the slice that indicates a location of the slice in the picture and an address of the tile.

In another example aspect, a method for decoding a picture in video or picture processing is disclosed. The picture is partitioned into one or more tiles, and each of the one or more tiles is partitioned into one or more slices. The method includes obtaining a tile identifier from a header of a slice in a bitstream, obtaining a second address from the header of the slice in the bitstream, and determining a first address of the slice indicating a location of the slice in the picture based on the tile identifier and the second address. The tile identifier indicates a tile in which the slice resides. The second address indicates a location of the slice in the tile.

In another example aspect, a method for processing one or more bitstream of a video or picture is disclosed. The picture is partitioned into one or more tiles, and each of the one or more tiles is partitioned into one or more slices. The method includes determining one or more target tile identifiers identifying one or more target tiles located in a target region of the picture. The one or more target tile identifiers are included in the one or more bitstreams. The method includes obtaining, from each of the one or more bitstreams, a tile identifier from a header of a slice. The tile identifier indicates a tile in which the slice resides. The method includes composing a sub-bitstream from the bitstream based on a determination that the tile identifier from the header of the slice is equal to one of the one or more target tile identifiers. The method includes determining a target tile parameter corresponding to the target region. The target tile parameter includes a target tile partitioning parameter indicating a partitioning manner of the one or more target tiles. The target tile parameter further includes the one or more target tile identifiers. The method also includes encoding the target tile parameter in a data unit of the sub-bitstream.

In another example aspect, an apparatus for video or picture processing is disclosed. The apparatus includes a coder control unit configured to generate one or more configurations, and an encoder configured to receive the one or more configurations from the coder control unit for generating one or more bitstreams. The encoder includes a partition unit that is configured to partition a picture into one or more tiles and partition each of the one or more tiles into one or more slices. The partition unit is further configured to perform, for each slice among the one or more slices determining a tile identifier that indicates a tile in which the slice resides, and determining a second address of the slice that indicates a location of the slice in the tile. The second address is determined based on a first address of the slice that indicates a location of the slice in the picture and an address of the tile.

In another example aspect, an apparatus for decoding a picture in video or picture processing is disclosed. The picture is partitioned into one or more tiles, and each of the one or more tiles is partitioned into one or more slices. The apparatus is configured to implement a method that includes obtaining a tile identifier from a header of a slice in a bitstream, obtaining a second address from the header of the slice in the bitstream, and determining a first address of the slice indicating a location of the slice in the picture based on the tile identifier and the second address. The tile identifier indicates a tile in which the slice resides. The second address indicates a location of the slice in the tile.

In another example aspect, an apparatus for processing one or more bitstreams of a video or picture is disclosed. The picture is partitioned into one or more tiles, and each of the one or more tiles is partitioned into one or more slices. The apparatus includes a control unit configured to determine one or more target tile identifiers identifying one or more target tiles located in a target region of the picture. The one or more target tile identifiers are included in the one or more bitstreams. The apparatus includes a parsing unit configured to obtain, from each of the one or more bitstreams, a tile identifier from a header of a slice. The tile identifier indicates a tile in which the slice resides. The apparatus includes a forming unit configured to compose a sub-bitstream based on a determination that the tile identifier from the header of the slice is equal to one of the one or more target tile identifiers, determine a target tile parameter corresponding to the target region, and encode the target tile parameter in a data unit of the sub-bitstream. The target tile parameter includes a target tile partitioning parameter indicating a partitioning manner of the one or more target tiles. The target tile parameter further includes the one or more target tile identifiers.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 4 shows another example of partitioning a picture into tiles and slices in accordance with one or more embodiments of the present technology.

FIG. 5A illustrate an example of syntax structures for representing a tile parameter in a bitstream in accordance with one or more embodiments of the present technology.

FIG. 5B illustrate another example of syntax structures for representing a tile parameter in a bitstream in accordance with one or more embodiments of the present technology.

FIG. 5C illustrate another example of syntax structures for representing a tile parameter in a bitstream in accordance with one or more embodiments of the present technology.

FIG. 5D illustrate another example of syntax structures for representing a tile parameter in a bitstream in accordance with one or more embodiments of the present technology.

FIG. 5E illustrate another example of syntax structures for representing a tile parameter in a bitstream in accordance with one or more embodiments of the present technology.

FIG. 5F illustrate another example of syntax structures for representing a tile parameter in a bitstream in accordance with one or more embodiments of the present technology.

FIG. 5G illustrate yet another example of syntax structures for representing a tile parameter in a bitstream in accordance with one or more embodiments of the present technology.

FIG. 6A shows an example of syntax structures for representing the tile identifier and the slice address in a bitstream in accordance with one or more embodiments of the present technology.

FIG. 6B shows another example of syntax structures for representing the tile identifier and the slice address in a bitstream in accordance with one or more embodiments of the present technology.

FIG. 11 shows an example of tiles and slices partitioning of a picture in a sub-bitstream in accordance with one or more embodiments of the present technology.

FIG. 14 shows an example electronic system in accordance with one or more embodiments of the present technology.

FIG. 15 is a flowchart representation of a method for video or picture processing in accordance with one or more embodiments of the present technology.

FIG. 17 is a flowchart representation of a method for processing one or more bitstreams in video or picture processing in accordance with one or more embodiments of the present technology.

DETAILED DESCRIPTION

Section headings are used in the present document only to improve readability and do not limit scope of the disclosed embodiments and techniques in each section to only that section. Certain features are described using the example of the H.264/AVC and H.265/HEVC standards. However, applicability of the disclosed techniques is not limited to only H.264/AVC or H.265/HEVC systems.

Techniques for compressing digital video and picture utilize correlation characteristics among pixel samples to remove redundancy in the video and picture. An encoder may partition a picture into one or more regions containing a number of units. Such a region breaks prediction dependencies within a picture, so that a region can be decoded (or at least syntax elements corresponding to this region can be correctly parsed) without referencing to data of another region in the same picture. Partitioning of the regions facilitate resynchronization after data losses, parallel processing, region of interesting coding and streaming, packetized transmission, viewport dependent streaming, and etc. For example, in H.264/AVC standard, one example of such regions can be slice and slice group. In H.265/HEVC standard, an example of such regions can be slice and tile.

In the development of next-generation video coding standard, the Moving Picture Experts Group (MPEG) requires that the next-generation video codec is to enable efficient extraction of a desired viewport from the compressed bitstream. In addition, in applications involving 4K, 8K and even more high-resolution videos, a viewer may be allowed to select a viewport for rendering on terminal devices. Thus, it is necessary to enable an efficient extraction of a sub-bitstream from the bitstream corresponding to the original resolution.

Figure 1A:
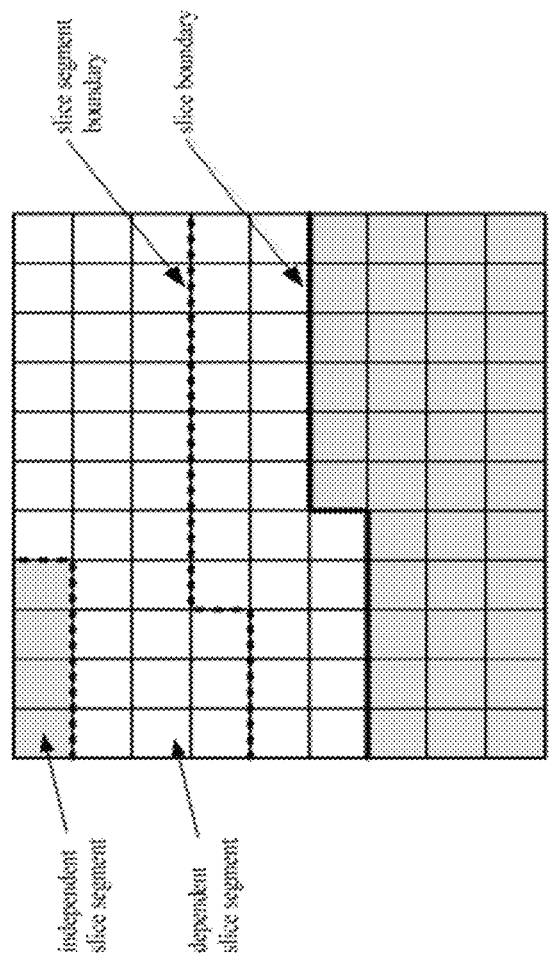
FIG. 1A shows an example of partitioning a picture into multiple slices and tiles in the H.265 standard.
Figure 1B:
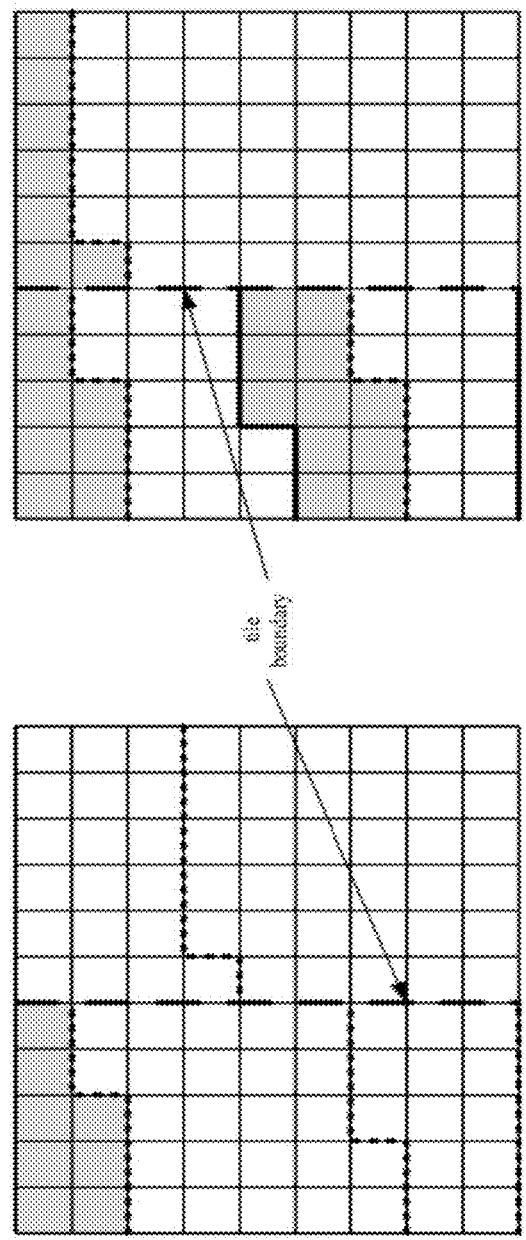
FIG. 1B shows another example of partitioning a picture into multiple slices and tiles in the H.265 standard.

Because the H.265/HEVC standard provides the highest coding efficiency among the current published video coding standards, H.265/HEVC is typically chosen as the codec in deploying the above described video services in the current stage. H.265/HEVC standard defines slices and tiles. A picture can be partitioned into one or more tiles and slices. FIG. 1A and FIG. 1B show examples of partitioning a picture into multiple slices and tiles in the H.265/HEVC standard. According to the H.265/HEVC standard, a conformance requirement is that one or both of the following conditions are to be fulfilled for each slice and tile:

All coding tree units (CTUs) in a slice belong to the same tile.

All CTUs in a tile belong to the same slice.

By restricting the loop filtering operations at tile boundaries (e.g., loop_filter_across_tiles_enabled_flag set to 0 in PPS), a tile in a picture can be decoded independently without referencing the other region of the picture outside the tile. Suppose that the same tile partitioning is applied to all the pictures in a coded video sequence (CVS). Furthermore, if an encoder restricts a search range of a region consisting of one or more tiles as a collocated region of the tile in one or more reference pictures for inter prediction coding, a decoder will decode the region without referencing any other parts outside the region both spatially in the current decoding picture containing the region and temporally in reference pictures. Such a region can be referred to as a motion constrained tile set (MCTS).

Extracting a partial bitstream corresponding to an MCTS from an original bitstream results in a sub-bitstream. Decoding the sub-bitstream obtains a video of the same resolution as that of the picture region represented by the MCTS. To make the sub-bitstream decodable, some syntax elements need to be rewritten in the extracting process. For example, if one or more MCTSs located at the center of a picture are extracted from an original bitstream to form a sub-bitstream, slice address (e.g., signaled in slice header) are to be rewritten in the extracting process so that in the sub-bitstream slice address starts from 0.

However, there exist several problems with the existing technologies. Generally, a Network Abstraction Layer (NAL) unit for the slice layer Raw Byte Sequence Payload (RBSP) is classified as Video Coding Layer (VCL) NAL unit. The existing technologies need to conduct VCL NAL unit modifications in extracting VCL NAL units of a subset of MCTSs from a bitstream and reposition the VCL NAL units to form a sub-bitstream. Such modification operations greatly raise the computational burden of devices providing streaming of sub-bitstreams to terminal devices.

Furthermore, except for the indications on tile partitioning in PPS specifying size and location of each tile, no other data structure or syntax elements are presented in a bitstream corresponding to a tile, which leads to extra complexity in implementations. For example, a device must get the slice address to determine which tile this slice resides in. When performing extracting a sub-bitstream from an original bitstream, an extractor in the device first decodes PPS to nail down the region covered by a target tile to be extracted in an original picture, decodes every slice header in this original bitstream to get a value of slice address. The extractor then converts the slice address into coordinate values of the slice (e.g., the coordinates of the first sample in the slice) to determine whether this slice is in this target tile. If yes, the extractor extracts the NAL units containing this slice to construct the sub-bitstream and rewrites slice address when necessary.

This patent document describes various techniques can be applied to avoid rewriting slice address in slice header in extracting process. For example, the slice address can be expressed as coordinates of the first sample in a slice. In some embodiments, the slice address is calculated as a sum of a first address indicated in a parameter set and a second address indicated in slice header. The first address is a global address of all the slices in a picture, and the second address is an offset of the first sample in the slice from the global address. When extracting NAL units of a single tile or multiple adjacent tiles (in 2D picture or in spherical picture) to form a sub-bitstream, an extractor only needs to modify the first address in the parameter set so that the extracted tiles are placed to the intended locations in the picture obtained by decoding the sub-bitstream (denoted as "sub-picture"), without modifying the second address in slice header.

For example, the address of a slice in a tile is (600, 800). In a bitstream, the first address in parameter set is coded as (0, 0), and the second address (600, 800). An extractor collects NAL units corresponds to this tile to build a sub-bitstream. In the sub-picture, the address of the slice is (0, 0). This extractor determines a new first address as (−600, −800), and uses the new first address to replace the one in parameter set. That is, this extractor rewrites a first address in parameter set as (−600, −800). Thus, this extractor does not need to rewrite the second address in slice header, eliminating the issues discussed above.

Some examples of the disclosed techniques are described in the following example embodiments. It is noted that a video is composed of a sequence of one or more pictures. A bitstream, which is also referred to as a video elementary stream, is generated by an encoder processing a video or picture. A bitstream can also be a transport stream or media file that is an output of performing a system layer process on a video elementary stream generated by a video or picture encoder. Decoding a bitstream results in a video or a picture. The system layer process is to encapsulate a video elementary stream. For example, the video elementary stream is packed into a transport stream or media file as payloads. The system layer process also includes operations of encapsulating transport stream or media file into a stream for transmission or a file for storage as payloads. A data unit generated in the system layer process is referred to as a system layer data unit. Information attached in a system layer data unit during encapsulating a payload in the system layer process is called system layer information, for example, a header of a system layer data unit. Extracting a bitstream obtains a sub-bitstream containing a part of bits of the bitstream as well as one or more necessary modifications on syntax elements by the extraction process. Decoding a sub-bitstream results in a video or a picture, which, compared to the video or picture obtained by decoding the bitstream, may be of lower resolution and/or of lower frame rate. A video or a picture obtained from a sub-bitstream could also be a region of the video or picture obtained from the bitstream.

Embodiment 1

This embodiment describes various techniques that can be used by an encoder.

Figure 2:
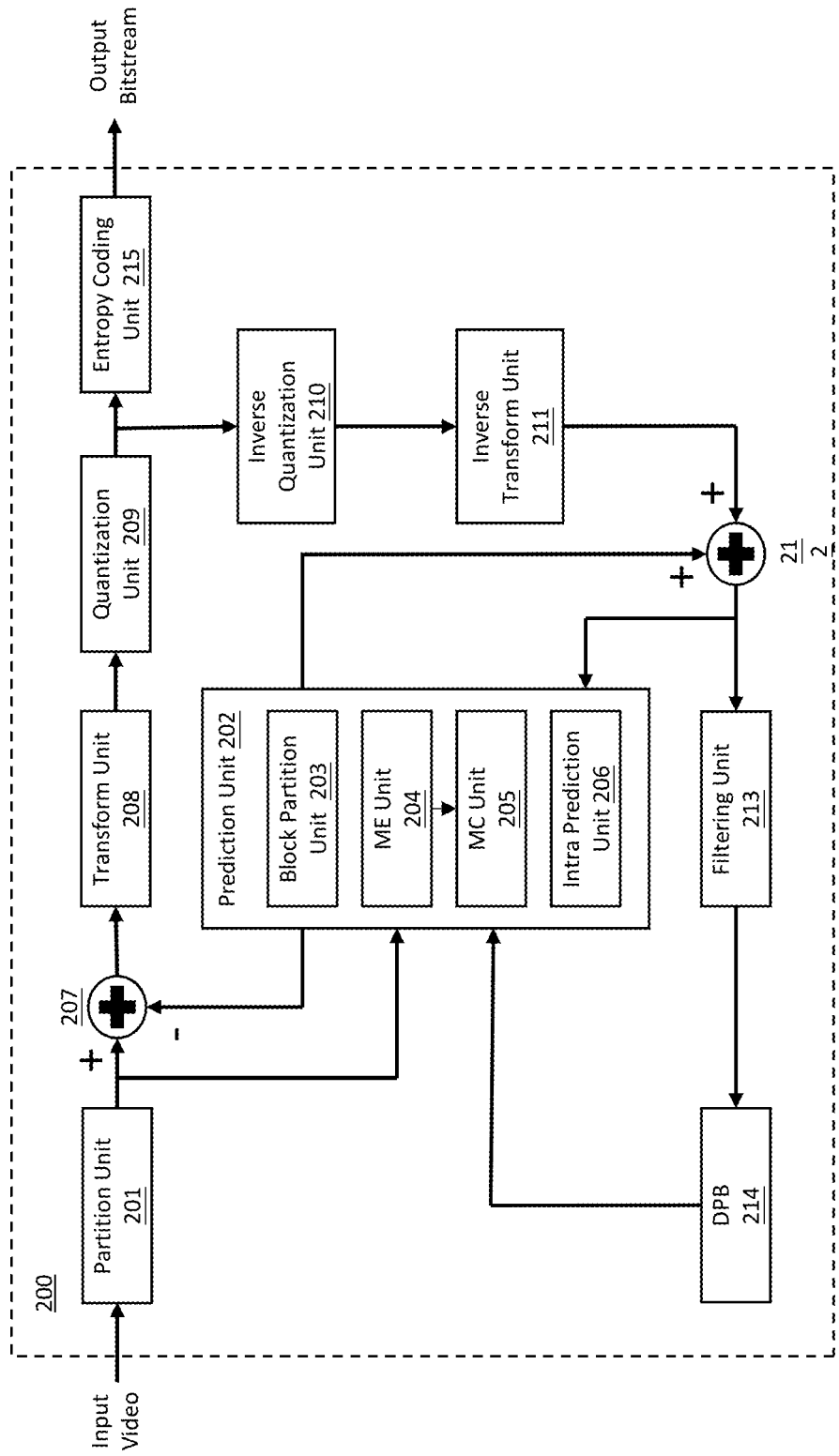
FIG. 2 depicts an example encoder coding a video or a picture in accordance with one or more embodiments of the present technology.

FIG. 2 depicts an example encoder 200 coding a video or a picture in accordance with one or more embodiments of the present technology. As shown in FIG. 2, an input of the encoder 200 is a video and an output is a bitstream. The video includes a sequence of pictures. The encoder 200 processes the pictures one by one in a preset order (e.g., an encoding order). The encoding order is determined according to a prediction structure specified in a configuration file for the encoder. Note that an encoding order of pictures in a video (corresponding to a decoding order of pictures at a decoder end) may be identical to, or may be different from, a displaying order of the pictures.

The partition unit 201 partitions a picture in an input video according to a configuration of the encoder 200. Generally, a picture can be partitioned into one or more maximum coding blocks. The maximum coding block is the maximum allowed or configured block in encoding process and usually a square region in a picture. A picture can be partitioned into one more tiles, and a tile may contain an integer number of maximum coding blocks, or a non-integer number of maximum coding blocks. A tile can further be partitioned into one or more slices, and each slice may contain an integer number of maximum coding blocks, or a non-integer number of maximum coding blocks. The partition unit 201 can be configured to partition a picture using a fixed pattern (e.g. a picture is partitioned into slices which contains a row of maximum coding blocks), or using a dynamic pattern. For example, to adapt to the restriction of maximum transmission unit (MTU) size, partition unit 201 can employ a dynamic slice partitioning method to ensure that a number of coding bits of every slice does not exceed the MTU restriction.

Figure 3:
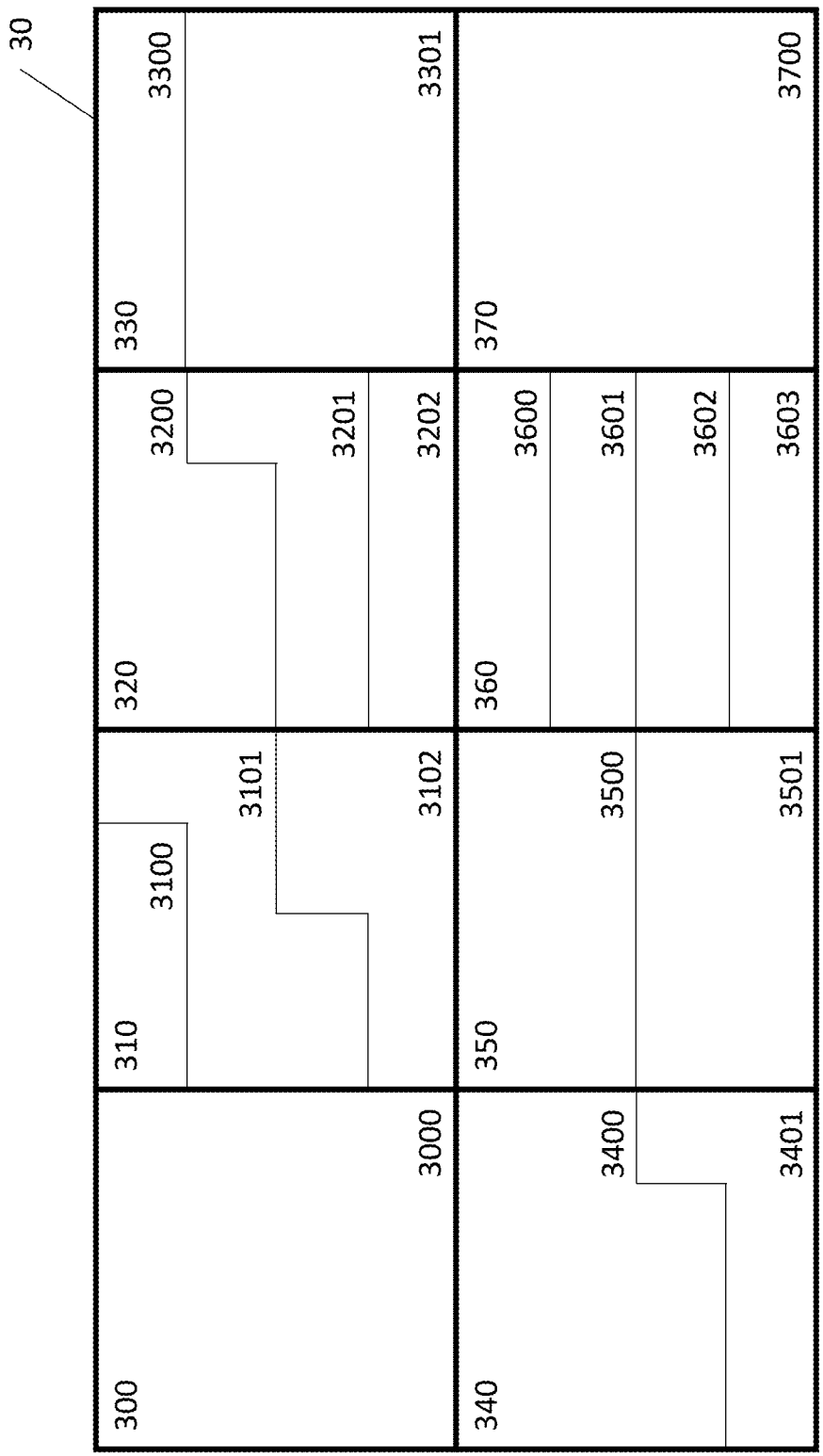
FIG. 3 shows an example of partitioning a picture into tiles and slices in accordance with one or more embodiments of the present technology.

FIG. 3 shows an example of partitioning a picture into tiles and slices in accordance with one or more embodiments of the present technology. Partition unit 201 partitions a picture 30 into 8 tiles 300, 310, 320, 330, 340, 350, 360 and 370. Generally, partitioning a picture into one or more tiles is performed according to an encoder configuration file. Partition unit 201 sets a partitioning parameter to indicate a partitioning manner of the picture into tiles. For example, a partitioning manner can be to partition the picture into tiles of equal sizes or nearly equal sizes. As another example, a partitioning manner may indicate locations of tile boundaries in rows and/or columns to facilitate flexible partitioning.

The partition unit 201 assigns tile identifiers to the tiles. In some embodiments, the partition unit 201 scans tiles in a raster scanning order in a picture (that is, from left to right in horizontal direction and from top to bottom in vertical direction). The partition unit 201 then assigns tile identifiers to tiles one by one. The tile identifiers can be set in an ascending or a descending order starting from a default value or a preset value. For example, as shown in FIG. 3, the partition unit 201 assigns tile identifiers 0, 1, 2, 3, 4, 5, 6 and 7 to tiles 300, 310, 320, 330, 340, 350, 360 and 370 respectively. In some implementations, the partition unit 201 may also assign the tile identifiers of arbitrary values to tiles. For example, the partition unit 201 may assign tile identifiers 19, 2000, 69, 256, 1450, 109, 666 and 190 to tiles 300, 310, 320, 330, 340, 350, 360 and 370 respectively, so long as the partition unit 201 meets a conformance restriction that any two tiles in a picture are assigned with different tile identifiers.

FIG. 4 shows another example of partitioning a picture into tiles and slices in accordance with one or more embodiments of the present technology. The partition unit 201 partitions a picture 40 into 8 tiles 4100, 4110, 4120, 4130, 4140, 4150, 4160 and 4170. The partition unit 201 assigns tile identifiers 10, 11, 12, 13, 14, 15, 16 and 17 to tiles 4100, 4110, 4120, 4130, 4140, 4150, 4160 and 4170 respectively. In some implementations, the partition unit 201 may also assign the tile identifiers of arbitrary values to tiles. For example, partition unit 201 may assign tile identifiers 100, 20, 60, 45, 37, 1000, 555 and 32 to tiles 4100, 4110, 4120, 4130, 4140, 4150, 4160 and 4170 respectively, so long as the partition unit 201 meets a conformance restriction that any two tiles in a picture are assigned with different tile identifiers.

The partition unit 201 also determines a tile parameter which includes a tile partitioning parameter indicating a partitioning manner of the picture into tiles and the tile identifiers. The partition unit 201 takes the tile parameter as one of its output parameters.

The partition unit 201 further partitions each tile in the picture into one or more slices. The partition unit 201 may choose to employ a dynamic slice partitioning scheme and/or a fixed slice partitioning scheme. Referring back to FIG. 3, the partition unit 201 uses a dynamic slice partitioning scheme. The partition unit 201 determines a tile identifier to a slice to indicate in which tile the slice resides. The partition unit 201 then partitions tile 300 into one slice 3000 and sets a tile identifier of this slice equal to 0, partitions tile 310 into three slices 3100, 3101 and 3102, and sets the tile identifiers of the slices equal to 1. It further partitions tile 320 into three slices 3200, 3201 and 3202, and sets tile identifiers of the slices equal to 2. Similarly, it partitions tile 330 into two slices 3300 and 3301, and sets tile identifiers of the slices equal to 3, and so on. One implementation example of dynamic slice partitioning is to adapt to the restriction of the MTU size. An encoder monitors the number of coding bits of a slice and terminates the slice when the number of coding bits reaches a threshold according to the size of MTU. Specially, in encoding the last slice in a tile, if the number of coding bits of this slice is below the threshold, the encoder may pad bits into the packet containing the coding bits of this slice.

Referring back to FIG. 4, the partition unit 201 uses a fixed slice partitioning scheme in this example. The partition unit 201 partitions each tile in picture 40 into 4 slices in the same manner. The partition unit 201 determines a tile identifier to a slice to indicate in which tile the slice resides. The partition unit 201 partitions tile 4100 into four slices 41000, 41001, 41002 and 41003, and sets the tile identifiers of the slices equal to 10. It then partitions tile 4110 into four slices 41100, 41101, 41102 and 41103, and sets the tile identifiers of the slices equal to 11. Similarly, it partitions tile 4120 into four slices 41200, 41201, 41202 and 41203, and sets the tile identifiers of the slices equal to 12, and so on. It is noted that the output parameters of the partition unit 201 include tile identifiers of the slices.

In partitioning the picture, the partition unit 201 records the addresses of the tiles in the picture. In some embodiments, an address of a tile can be represented as the coordinates of the location of the first sample in the tile in the picture. In some embodiments, an address of a tile can be represented as an ordering number of the first coding block in the tile in the picture. The partition unit 201 also records a range in the picture covered by a tile, for example, as the locations of a starting sample and an ending sample of a tile in the picture, or as ordering numbers of a starting coding block and an ending block of a tile in the picture.

Furthermore, the partition unit 201 records the addresses of the slices in the picture. An address of a slice in the picture is denoted as the first address of the slice. In some embodiments, the first address of the slice can be represented as the coordinates of the location of the first sample in the slice in the picture. In some embodiments, the first address of the slice can be represented as an ordering number of the first block in the slice in the picture. The partition unit 201 also records a range in the picture covered by a slice, for example, as the locations of a starting sample and an ending sample of a slice in the picture, or as ordering numbers of a starting coding block and an ending block of a slice in the picture. Because the partition unit 201 already knows the size of coding block (e.g. from encoder configuration file), the partition unit 201 can convert coordinates into ordering number, and vice versa.

When the partition unit 201 determines that a slice is in a tile according to the first address of the slice, the tile in the picture, and the covering range of the tile in the picture, the partition unit 201 determines a second address of the slice as the coordinates of the location of the first sample in the slice in the tile, or as an ordering number of the first coding block in the slice in the tile. If the first address is represented by the coordinates, the second address is equal to the coordinate offset between the location of the first sample in the slice and the location of the first sample in the tile in which the slice resides. If the first address is represented by the ordering number of a coding block, the second slice address is equal to the ordering number of the first coding block in the tile. The ordering number is determined based on a scanning order of coding blocks in a tile of a predefined or selected order (e.g. raster scanning order). For example, the second slice address of the first slice in a tile is equal to 0 because the ordering number of the first coding block of the first slice in the tile is 0 regardless of which scanning order is used. It is also noted that the output parameters of the partition unit 201 also include the second addresses of the slices.

Referring back to FIG. 2, the prediction unit 202 determines the prediction samples of a coding block. The prediction unit 202 includes a block partition unit 203, a Motion Estimation (ME) unit 204, a Motion Compensation (MC) unit 205, and an intra prediction unit 206. The input of the prediction unit 202 includes a maximum coding block output by the partition unit 201. The input of the prediction unit 202 also includes attribute parameters associated with the maximum coding block, such as the location of the maximum coding block in a picture, in a slice, and/or in a tile. The prediction unit 202 partitions the maximum coding block into one or more coding blocks, which can also be further partitioned into smaller coding blocks, using one or more partitioning methods such as quadtree, binary split, and/or ternary split. The prediction unit 202 determines the prediction samples for the coding block obtained in partitioning. Optionally, the prediction unit 202 can further partition a coding block into one or more prediction blocks to determine the prediction samples. The prediction unit 202 can employ one or more pictures in the Decoded Picture Buffer (DPB) unit 214 as a reference to determine inter-prediction samples of the coding block. The prediction unit 202 can also employ the reconstructed parts of the picture from the adder 212 (which is not processed by filtering unit 213) as a reference to derive inter-prediction samples of the coding block. In some embodiments, the prediction unit 202 determines the prediction samples of the coding block and associated parameters for deriving the prediction samples, which are also output parameters of the prediction unit 202, using the general rate-distortion optimization (RDO) methods.

Inside the prediction unit 202, the block partition unit 203 determines the partitioning of the coding block. The block partition unit 203 partitions the maximum coding block into one or more coding blocks, which can also be further partitioned into smaller coding blocks. One or more partitioning method can be applied, such as quadtree, binary split and ternary split. Optionally, block partition unit 203 can further partition a coding block into one or more prediction blocks to determine the prediction samples. The block partition unit 203 can adopt the RDO methods in the determination of partitioning of the coding block. Output parameters of the block partition unit 203 include one or more parameters indicating the partitioning of the coding block.

The ME unit 204 and the MC unit 205 use one or more decoded pictures from the DPB unit 214 as a reference picture to determine inter-prediction samples of a coding block. The ME unit 204 constructs one or more reference lists containing one or more reference pictures and determines one or more matching blocks in the reference picture for the coding block. The MC unit 205 derives prediction samples using the samples in the matching block, and calculates a difference (e.g., residual) between the original samples in the coding block and the prediction samples. Output parameters of ME unit 204 indicate the location of the matching block, including the reference list index, the reference index (refIdx), the motion vector (MV), and etc. The reference list index indicates the reference list containing the reference picture in which the matching block locates. The reference index indicates the reference picture in the reference list containing the matching block. The MV indicates the relative offset between the locations of the coding block and the matching block in an identical coordinate for representing locations of pixels in a picture. Output parameters of MC unit 205 include inter-prediction samples of the coding block, as well as parameters for constructing the inter-prediction samples. For example, weighting parameters for samples in the matching block, filter type and parameters for filtering samples in the matching block can be included as output parameters. In some embodiments, the RDO methods can be applied jointly to the ME unit 204 and the MC unit 205 for getting optimal matching block in rate-distortion (RD) sense and corresponding output parameters of the two units.

In some implementations, the ME unit 204 and the MC unit 205 can use the current picture containing the coding block as a reference to obtain intra-prediction samples of the coding block. In this document, intra-prediction means that only the data in a picture containing a coding block is employed as a reference for deriving prediction samples of the coding block. In this case, the ME unit 204 and the MC unit 205 use a reconstructed part in the current picture. The reconstructed part is from the output of adder 212 and is not processed by filtering unit 213. For example, the encoder 200 allocates a picture buffer to (temporally) store the output data of adder 212. Another method for the encoder is to reserve a special picture buffer in the DPB unit 214 to keep the data from adder 212.

The intra prediction unit 206 use the reconstructed part of the current picture containing the coding block as a reference to obtain intra prediction samples of the coding block. The reconstructed part is not processed by filtering unit 213. The intra prediction unit 206 takes reconstructed neighboring samples of the coding block as an input of a filter for deriving intra prediction samples of the coding block. The filter can be an interpolation filter (e.g. for calculating prediction samples when using angular intra prediction), or a low-pass filter (e.g. for calculating DC value). In some implementations, intra prediction unit 206 can perform searching operations to get a matching block of the coding block in a range of reconstructed parts in the current picture. The intra prediction unit then sets samples in the matching block as intra prediction samples of the coding block. In some embodiments, the intra prediction unit 206 invokes the RDO methods to determine an intra prediction mode (e.g., a method for calculating intra prediction samples for a coding block) and corresponding prediction samples. Besides the intra prediction samples, output of the intra prediction unit 206 also includes one or more parameters indicating an intra prediction mode in use.

The adder 207 is configured to calculate a difference between the original samples and the prediction samples of a coding block. In some embodiments, the output of the adder 207 is the residual of the coding block. The residual can be represented as an N×M 2-dimentional matrix, wherein N and M are two positive integers. N and M can be of equal or different values.

The transform unit 208 takes the output from the adder 207 (e.g., the residual) as its input. The transform unit 208 may apply one or more transform methods to the residual. From the perspective of signal processing, a transform method can be represented by a transform matrix. Optionally, the transform unit 208 may determine to use a rectangle block (it is noted that a square block is a special case of a rectangle block) with the same shape and size as that of the coding block to be a transform block for the residual. Optionally, the transform unit 208 may determine to partition the residual into several rectangle blocks (including a special case that width or height of a rectangle block is one sample) and perform transform operations on the several rectangles sequentially. For example, the transform operations can be performed according to a default order (e.g. raster scanning order), a predefined order (e.g. an order corresponding to a prediction mode or a transform method), and/or a selected order for several candidate orders. The transform unit 208 may determine to perform multiple transforms on the residual. For example, the transform unit 208 first performs a core transform on the residual, and then perform a secondary transform on coefficients obtained after finishing the core transform. The transform unit 208 may use the RDO methods to determine transform parameter, which indicates the execution manners used in the transform process applied to the residual block. For example, the execution manners include partitioning the residual block into transform blocks, transform matrix, multiple transforms, and etc. The transform parameter is included in the output parameters of the transform unit 208. The output parameters of the transform unit 208 may also include data obtained after transforming the residual (e.g. transform coefficients) which could be represented by a 2-dimentional matrix.

The quantization unit 209 quantizes the data outputted by the transform unit 208 after its transforming the residual. The quantizer used in the quantization unit 209 can be one or both of scalar quantizer and vector quantizer. In some video encoders, the quantization unit 209 employs a scalar quantizer. The quantization step of a scalar quantizer is represented by a quantization parameter (QP) in a video encoder. In some embodiments, an identical mapping between the QP and the quantization step is preset or predefined in an encoder and a corresponding decoder. A value of QP (e.g., the picture level QP and/or the block level QP) can be set according to a configuration file applied to an encoder, or be determined by a coder control unit in an encoder. For example, the coder control unit determines a quantization step of a picture and/or a block using rate control (RC) methods and then converts the quantization step into the QP according to the mapping between the QP and the quantization step. The control parameter for quantization unit 209 includes QP. The output of the quantization unit 209 includes one or more quantized transform coefficients (also known as "Level") represented in a form of a 2-dimensional matrix.

The inverse quantization unit 210 performs scaling operations on the output of the quantization unit 209 to get reconstructed coefficients. The inverse transform unit 211 performs inverse transform on the reconstructed coefficients from the inverse quantization 210 according to the transform parameter from the transform unit 208. The output of the inverse transform unit 211 includes a reconstructed residual. Specially, when an encoder determines to skip quantizing in coding a block (e.g. an encoder implements the RDO methods to determine whether applying quantization to a coding block), the encoder guides the output data of transform unit 208 to the inverse transform unit 211 by bypassing the quantization unit 209 and the inverse quantization 210.

The adder 212 takes the reconstructed residual and the prediction samples of the coding block from the prediction unit 202 as its input and calculates the reconstructed samples of the coding block. The adder 212 then puts the reconstructed samples into a buffer (e.g. a picture buffer). For example, the encoder 200 allocates a picture buffer to (temporally) store the output data of the adder 212. Another method for the encoder 200 is to reserve a special picture buffer in the DPB unit 214 to keep the data from the adder 212.

The filtering unit 213 performs filtering operations on the reconstructed picture samples in the decoded picture buffer and outputs decoded pictures. The filtering unit 213 may include one filter or several cascading filters. For example, according to the H.265/HEVC standard, the filtering unit 210 includes two cascading filters: a deblocking filter and a sample adaptive offset (SAO) filter. The filtering unit 213 may also include neural network filters. The filtering unit 213 may start filtering the reconstructed samples of a picture when the reconstructed samples of all coding blocks in the picture have been stored in the decoded picture buffer, which can be referred to as the "picture layer filtering". Optionally, an alternative implementation (referred to as "block layer filtering") of picture layer filtering for the filtering unit 213 is to start filtering the reconstructed samples of a coding block in a picture if the reconstructed samples are not used as a reference in encoding all successive coding blocks in the picture. Block layer filtering does not require the filtering unit 213 to hold filtering operations until all reconstructed samples of a picture are available, and thus saves time delay among threads in an encoder. In some embodiments, the filtering unit 213 determines filtering parameter by invoking the RDO methods. The output of the filtering unit 213 includes the decoded samples of a picture and filtering parameter including indication information of filter, filter coefficients, filter control parameter and etc.

The encoder 200 stores the decoded picture from the filtering unit 213 in the DPB 214. The encoder 200 may determine one or more instructions applied to the DPB 214, which are used to control operations on the pictures in DPB 214. For example, the instructions include the time length of a picture storing in DPB 214, outputting a picture from DPB 214, and etc. It is noted that such instructions can be the output parameters of DPB 214.

The entropy coding unit 215 performs binarization and entropy coding on one or more coding parameters of a picture, which converts a value of a coding parameter into a code word consisting of binary symbol "0" and "1" and writes the code word into a bitstream according to a specification or a standard. The coding parameters may be classified as texture data and non-texture data. Texture data are transform coefficients of a coding block, and non-texture data are the other data in the coding parameters except texture data, including output parameters of the units in the encoder, parameter set, header, supplemental information, and etc. The output of the entropy coding unit 215 includes a bitstream conforming to a specification or a standard.

The entropy coding unit 215 receives the output parameters from the partition unit 201, particularly the tile parameter including tile partitioning parameter indicating a partitioning manner of the picture into tiles and the tile identifiers, tile identifiers of the slices indicating a tile in which a slice resides, and the second addresses of the slices indicating a location of a slice in a tile. The entropy coding unit 215 codes the tile parameter in a data unit in the bitstream (e.g., a parameter set data unit, which will be discussed below).

FIGS. 5A-5E illustrate examples of syntax structures for representing a tile parameter in a bitstream in accordance with one or more embodiments of the present technology. It is noted that a syntax in bold in FIG. 5A and FIG. 5E is a syntax element represented by a string of one or more bits existing in the bitstream, and u(1) and ue(v) are two coding methods with the same function as that in published standards like H.264/AVC and H.265/HEVC.

FIG. 5F illustrates an example of syntax structure for coding tile partitioning parameter indicating a partitioning manner of the picture into tiles in accordance with one or more embodiments of the present technology. The syntax elements in FIG. 5F are conceptually packed in a data structure namely tile_partitioning( ). FIG. 5G shows an example of syntax structure for coding tile identifiers in accordance with one or more embodiments of the present technology. Similarly, the syntax elements in FIG. 5G are conceptually packed in a data structure namely tile_ids( ). In FIG. 5G, variable numTilesInPic is set to be equal to a product of (num_tile_columns_minus1+1) and (num_tile_rows_minus1+1).

In FIG. 5A and FIG. 5F, the semantics of the syntax elements are the same as specified in H.265/HEVC standard. The semantics of the syntax elements in FIG. 5G are presented as follows:

tile_id_present_flag: tile_id_present_flag equal to 1 specifies the presence of tile identifiers syntax elements. tile_id_present_flag equal to 0 specifies the absence of tile identifiers syntax elements. When tile_id_present_flag is equal to 0, tile identifiers of tiles in a picture are derived as starting from 0 and increasing in an ascending order along with a scanning order (e.g., a raster scanning order) of tiles in the picture. When the tile identifiers syntax elements are not presented, tile_id_present_flag is inferred to be 0.

tile_id_ascending_flag: tile_id_asencding_flag equal to 1 specifies that tile identifiers of tiles in a picture are derived as values starting from a preset value specified by tile_id_starting_value and increasing in an ascending order along with the scanning order of tiles in the picture. tile_id_ascending_flag equal to 0 specifies that a tile identifier of the i-th tile in the scanning order of tiles in a picture is set be equal to a value specified by tile_id[i].

tile_id[i]: tile_id[i] specifies tile identifier of the i-th tile in the scanning order of tiles (e.g., raster scanning order) in a picture.

Referring back to FIG. 3 as an example, the entropy coding unit 215 sets the values of syntax elements in FIG. 5F according to tile partitioning parameter from partition unit 201 as:
  num_tile_columns_minus1=3;
  num_tile_rows_minus1=1;
  uniform_spacing_flag=1.

The entropy coding unit 215 sets the values of syntax elements in FIG. 5G according to the tile identifiers from partition unit 201 as:
  tile_id_present_flag=0.

Referring back to FIG. 4 as another example, the entropy coding unit 215 sets the values of syntax elements in FIG. 5F according to tile partitioning parameter from partition unit 201 as:
  num_tile_columns_minus1=3;
  num_tile_rows_minus1=1;
  uniform_spacing_flag=1.

The entropy coding unit 215 sets the values of syntax elements in FIG. 5G according to the tile identifiers from partition unit 201 as:
  tile_id_present_flag=1;
  tile_id_ascending_flag=1;
  tile_id_starting_value=10.

The entropy coding unit 215 encodes the above syntax elements and writes coding bits into the bitstream. The syntax structures in FIGS. 5A, 5B and 5C can be separately presented in one or more data units in the bitstream. In some embodiments, the data unit can be a parameter set data unit. Even if the syntax structures in FIGS. 5A, 5B and 5C are presented in a single data unit, the entropy coding unit 215 may organize the corresponding bits of these 3 syntax structures partially adjacent to each other, as shown in the example in FIG. 5D wherein bits of syntax elements in tile_ids( ) follow the bits of syntax elements tile_partitioning( ). In some embodiments, the entropy coding unit 215 may also organize the corresponding bits of these 3 syntax structures adjacent to each other, as shown in the example in FIG. 5E wherein bits of tile_partitioning( ) follow tiles_enable_flag, and bits of syntax elements in tile_ids( ) follow the bits of syntax elements tile_partitioning( ).

FIGS. 6A-6B show examples of syntax structures for representing the tile identifier and the slice address (e.g., the second address) in a bitstream in accordance with one or more embodiments of the present technology. It is noted that a syntax in bold is a syntax element represented by a string of one or more bits existing in the bitstream, and u(1) and ue(v) are two coding methods with the same function as in published standards like H.264/AVC and H.265/HEVC.

The semantics of the syntax elements in FIG. 6A are presented as follows.

slice_tile_id: slice_tile_id specifies a tile identifier of a tile in which the slice resides in;

slice_address: slice_address specifies an address of the first coding block in the slice or slice segment, in coding block scan (e.g., a raster scan) of a tile.

Referring back to FIG. 3 as an example, according to tile identifiers of the slices and second addresses of the slices from partition unit 201, the entropy coding unit 215 sets the values of syntax elements in FIG. 6A for slice 3300 as:
  slice_tile_id=3;
  slice_address=0.

Suppose that there are 12 coding blocks ahead of slice 3301 in tile 330 in coding, the values for slice 3301 are set as:
  slice_tile_id=3;
  slice_address=12.

The entropy coding unit 215 may organize the coding bits of the syntax elements shown in FIG. 6B in a slice header or slice segment header. The entropy coding unit 215 may add zero or more other syntax elements between slice_tile_id and slice_address. In some embodiments, the entropy coding unit 215 may represent slice_address as the coordinates of the first sample in a slice or slice segment in a tile.

The semantics of the syntax elements in FIG. 6B are presented as follows.

slice_tile_id: slice_tile_id specifies a tile identifier of a tile in which the slice resides in.

first slice in tile flag: first_slice_in_tile_flag equal to 1 specifies that the slice or slice segment is the first slice or slice segment of the tile in decoding order. first_slice_in_pic_flag equal to 0 specifies that the slice or slice segment is not the first slice or slice segment of the tile in decoding order.

slice_address: slice_address specifies an address of the first coding block in the slice or slice segment, in coding block scan (e.g., raster scan) of a tile.

In some embodiments, the entropy coding unit 215 may organize the coding bits of the syntax elements shown in FIG. 6B in a slice header or slice segment header. In some implementations, the entropy coding unit 215 may add zero or more other syntax elements between slice_tile_id and first_slice_in_tile_flag. In some implementations, the entropy coding unit 215 may add zero or more other syntax elements between first_slice_in_tile_flag and slice_address. In some implementations, the entropy coding unit 215 may represent slice_address as coordinates of the first sample in a slice or slice segment in a tile.

Referring back to FIG. 3 as an example, according to the tile identifiers of the slices and the second addresses of the slices from partition unit 201, the entropy coding unit 215 sets the values of syntax elements in FIG. 6B for slice 3300 as:
    slice_tile_id=3;
    first_slice_in_tile_flag=1.

Suppose that there are 12 coding blocks ahead of slice 3301 in tile 330 in coding order, the values of syntax elements for slice 3301 are set as:
    slice_tile_id=3;
    first_slice_in_tile_flag=0;
    slice_address=12.

The entropy coding unit 215 may organize the coding bits of the syntax elements in FIG. 6A in a slice header or slice segment header. In some embodiments, the entropy coding unit 215 may add zero or more other syntax elements between slice_tile_id and slice_address. In some implementations, the entropy coding unit 215 may represent slice_address as coordinates of the first sample in a slice or slice segment in a tile.

FIG. 15 is a flowchart representation of a method 1500 for video or picture processing in accordance with one or more embodiments of the present technology. The method 1500 includes, at step 1501, partitioning a picture into one or more tiles. The method 1500 also includes, at step 1502, generating one or more bitstreams using one or more configurations based on the one or more tiles. In particular, generating each of the one or more bitstreams includes partitioning each of the one or more tiles into one or more slices, and performing, for each slice among the one or more slices: (1) a first encoding step to encode a tile identifier in a header of the slice, and (2) a second encoding step to encode, in the header of the slice, a second address of the slice that indicates a location of the slice in the tile. The tile identifier indicates a tile in which the slice resides, and the second address is determined based on a first address of the slice that indicates a location of the slice in the picture and an address of the tile.

Embodiment 2

Figure 7:
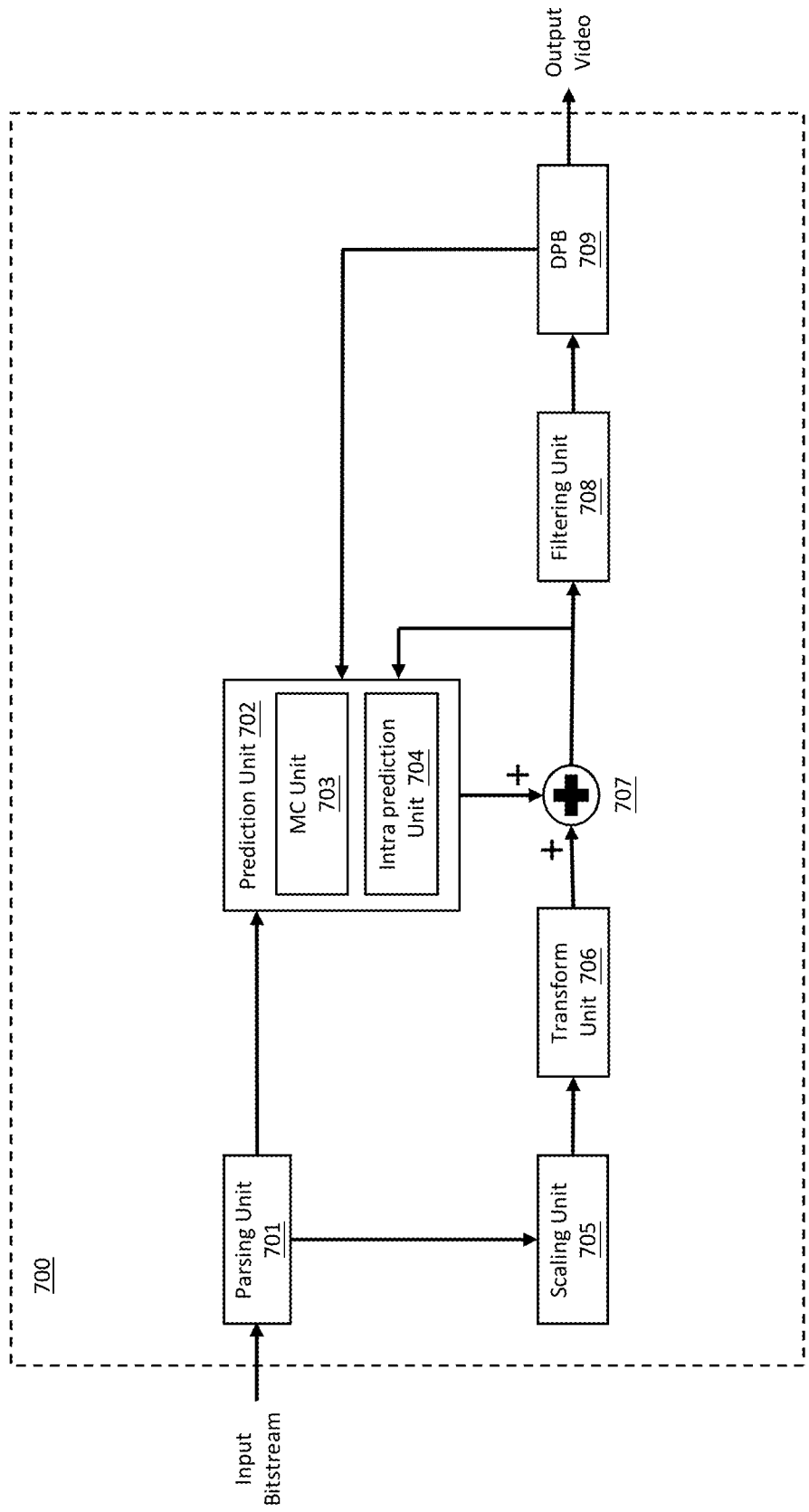
FIG. 7 depicts an example decoder decoding a bitstream in accordance with one or more embodiments of the present technology.

This embodiment describes various techniques that can be used by a decoder. FIG. 7 depicts an example decoder 700 decoding a bitstream in accordance with one or more embodiments of the present technology. As shown in FIG. 7, an input of the decoder 700 is a bitstream, and output of the decoder 700 is a decoded video or picture obtained by decoding the bitstream.

The parsing unit 701 in the decoder 700 parses the input bitstream. The parsing unit 701 uses entropy decoding methods and/or binarization methods specified in a standard to convert each code word in the bitstream that includes one or more binary symbols (i.e. "0" and "1") to a numerical value of a corresponding parameter. The parsing unit 701 also derives the parameter value according to one or more available parameters. For example, when a flag in the bitstream indicates that a decoding block is the first decoding block in a picture, the parsing unit 701 sets the address parameter that indicates an address of the first decoding block of a slice in a picture to be 0.

The parsing unit 701 parses one or more data units, such as the parameter set data unit, in the bitstream to get a tile parameter. The tile parameter includes a tile partitioning parameter indicating a partitioning manner of the picture into tiles and one or more tile identifiers correspondingly.

FIGS. 5A-5E illustrate examples of the syntax structures for parsing the tile parameter in the bitstream by parsing unit 701. The syntax structures in FIGS. 5A, 5B and 5C can be separately parsed and obtained from one or more data units in the bitstream. In some embodiments, the data unit can be a parameter set data unit. In some embodiments, if the syntax structures in FIGS. 5A, 5B and 5C are presented in a single data unit in the bitstream, the parsing unit 701 may parse the three syntax structures by reading corresponding bits adjacent to each other. For example, as shown in the example in FIG. 5D, the bits of syntax elements in tile_ids( ) follow the bits of syntax elements tile_partitioning( ). In some embodiments, the parsing unit 701 may also parse the three syntax structures by reading corresponding bits adjacent to each other. As shown in the example in FIG. 5E, the bits of tile_partitioning( ) follow tiles_enable_flag, and bits of syntax elements in tile_ids( ) follow the bits of syntax elements tile_partitioning( ).

The parsing unit 701 can obtain the values of the syntax elements in FIG. 5F as follows:
    num_tile_columns_minus1 equal to 3;
    num_tile_rows_minus1 equal to 1;
    uniform_spacing_flag equal to 1.

The parsing unit 701 can also obtain the values of the syntax elements in FIG. 5G as follows:
    tile_id_present_flag equal to 0.

The parsing unit 701 then can determine the partitioning manner as "partitioning a picture into 4 columns and 2 rows uniformly" and assign the tiles identifiers of the tiles as "starting from 0 in an ascending order in raster scanning order of the tiles in the picture." That is, the parsing unit 701 can determine the tile partitioning and tile identifiers of picture 30 as illustrated in FIG. 3.

The parsing unit 701 can obtain the values of the syntax elements in FIG. 5F as follows:
    num_tile_columns_minus1 equal to 3;
    num_tile_rows_minus1 equal to 1;
    uniform_spacing_flag equal to 1.

The parsing unit 701 can also obtain the values of the syntax elements in FIG. 5G as follows:
    tile_id_present_flag equal to 1;
    tile_id_ascending_flag equal to 1;
    tile_id_starting_value equal to 10.

The parsing unit 701 then can determine the partitioning manner as "partitioning a picture into 4 columns and 2 rows uniformly" and assigns the tiles identifiers of the tiles as "starting from 10 in an ascending order in raster scanning order of the tiles in the picture." That is, the parsing unit 701 determines the tile partitioning and tile identifiers of picture 40 as illustrated in FIG. 4.

In addition, according to the width and the height of the picture and tile partitioning manner, the parsing unit 701 can derive the address of tiles in the picture. An address of a tile can be represented as the coordinates of the location of the first sample in the tile in the picture, or an ordering number of the first coding block in the slice in the picture. For example, suppose that the height and width of the picture are picHeight and picWidth, a raster scanning order of a tile in the picture is tileR (starting from 0). Take tile partitioning in FIG. 3 for example. The parsing unit 701 calculates the address of the tile expressed as coordinates (tileX, tileY) of the first sample in the tile in the picture as:

$$tileX=(picWidth/(num\_tile\_columns\_minus1+1))*(tileR \% (num\_tile\_columns\_minus1+1)),$$

and $$tileY=(picHeight/(num\_tile\_rows\_minus1+1))*(tileR/(num\_tile\_columns\_minus1+1)).$$

Moreover, parsing unit 701 also determines the width (tileWidth) and height (tileHeight) of a tile in FIG. 3 as:

$$tileWidth=picWidth/(num\_tile\_columns\_minus1+1),$$

$$tileHeight=picHeight/(num\_tile\_rows\_minus1+1).$$

All the arithmetic operators used in the above calculations are the same as those specified in H.265/HEVC standard.

Referring back to FIG. 3 as an example, the parsing unit 701 can obtain the values of the syntax elements of a first slice shown in FIG. 6A as follow:
slice_tile_id equal to 3;
slice_address equal to 0.

The parsing unit 701 can also obtain the syntax elements of a second slice in FIG. 6A as follows:
slice_tile_id equal to 3;
slice_address equal to 12.

Supposing that the parsing unit 701 does not obtain any other slices with slice_tile_id equal to 3 in the bitstream corresponding to picture 30 and that there are 12 decoding blocks in the first slice, the parsing unit 701 can determine that both slices reside in the tile with its tile identifier being equal to 3 as indicated by slice_tile_id. That is, slice 3300 (the first slice) and 3301 (the second slice) in tile 330.

An address of a slice can be represented as the coordinates of the location of the first sample in the slice in the picture, or an ordering number of the first block in the slice in the picture. Supposing that a size of the decoding block is nBlock×nBlock, the parsing unit 701 can calculate a second slice_address of a slice expressed as coordinates in a tile (xBlockInTile, yBlockInTile) as follows:

$$xBlockInTile=(slice\_address \% (tileWidth/nBlock))*nBlock,$$

$$yBlockInTile=(slice\_address/(tileWidth/nBlock))*nBlock.$$

The parsing unit 701 then calculates a first slice address of a slice expressed as coordinates in the picture (xBlockInPic, yBlockInPic) as:

$$xBlockInPic=xBlockInTile+tileX,$$

$$xBlockInPic=yBlockInTile+tileY.$$

All the arithmetic operators used in the above calculations are the same as those specified in H.265/HEVC standard. The parsing unit 701 can convert coordinates into ordering number, and vice versa, with the knowledge of decoding block size.

Referring back to FIG. 3 again as an example, the parsing unit 701 can obtain the values of the syntax elements of a first slice in FIG. 6B as follows:
slice_tile_id equal to 3;
first_slice_in_tile_flag equal to 1.

The parsing unit 701 can also obtain the syntax elements of a second slice in FIG. 6B as follows:
slice_tile_id equal to 3;
first_slice_in_tile_flag equal to 0;
slice_address equal to 12.

Supposing that parsing unit 701 does not obtain any other slices with slice_tile_id equal to 3 in the bitstream corresponding to the picture and that there are 12 decoding blocks in the first slice, the parsing unit 701 determines that both slices reside in the tile with its tile identifier being equal to 3 as indicated by slice_tile_id. That is, slice 3300 (the first slice) and 3301 (the second slice) in tile 330, and slice_address for slice 3300 is 0.

Supposing that a size of the decoding block is nBlock×nBlock, the parsing unit 701 can calculate a second slice address of a slice expressed as coordinates in a tile (xBlockInTile, yBlockInTile) as follows:

$$xBlockInTile=(slice\_address \% (tileWidth/nBlock))*nBlock,$$

$$yBlockInTile=(slice\_address/(tileWidth/nBlock))*nBlock.$$

The parsing unit 701 then calculates a first slice address of a slice expressed as coordinates in the picture (xBlockInPic, yBlockInPic) as follows:

$$xBlockInPic=xBlockInTile+tileX,$$

$$xBlockInPic=yBlockInTile+tileY.$$

All the arithmetic operators used in the above calculations are the same as those specified in H.265/HEVC standard. Parsing unit 701 can convert coordinates into ordering number, and vice versa, with the knowledge of decoding block size.

The parsing unit 701 can pass the above determined parameters to the other units in the decoder for their determining locations of a tile, a slice, and a decoding block used in related decoding processes (e.g., derivation of neighboring blocks and samples, storing reconstructed samples of a decoding block into a buffer, determination of samples to be filtered, and etc.).

The parsing unit 701 can pass one or more prediction parameters for deriving prediction samples of a decoding block to prediction unit 702. The prediction parameters can include output parameters of partitioning unit 201 and prediction unit 202 in the aforementioned encoder.

The parsing unit 701 can pass one or more residual parameters for reconstructing residual of a decoding block to scaling unit 705 and transform unit 706. The residual parameters can include output parameters of transform unit 208 and quantization unit 209 and one or more quantized coefficients (e.g., "Levels") output by quantization unit 209 in an encoder.

The parsing unit 701 can also pass filtering parameter to filtering unit 708 for filtering (e.g. in-loop filtering) reconstructed samples in a picture.

The prediction unit 702 can derive prediction samples of a decoding block according to the prediction parameters. The prediction unit 702 includes the MC unit 703 and intra prediction unit 704. The input of prediction unit 702 may also include reconstructed part of a current decoding picture outputted from adder 707 (which is not processed by filtering unit 708) and one or more decoded pictures in DPB 709.

When the prediction parameters indicate inter prediction mode is used to derive prediction samples of the decoding block, the prediction unit 702 employs the same approach as that for the ME unit 204 in the encoder to construct one or more reference picture lists. A reference list may contain one or more reference pictures from DPB 709. The MC unit 703 can determine one or more matching blocks for the decoding block according to an indication of the reference list, the reference index, and the MV in the prediction parameters. The MC unit 703 can use the same methods as that in the MC unit 205 in the encoder to get inter prediction samples of the decoding block. The prediction unit 702 outputs the inter prediction samples as the prediction samples of the decoding block.

In some embodiments, the MC unit 703 may use the current decoding picture containing the decoding block as a reference to obtain intra prediction samples of the decoding block. It is noted that intra prediction means that only the data in a picture containing a coding block is employed as a reference for deriving prediction samples of the coding block. In this case, the MC unit 703 use reconstructed part in the current picture. The reconstructed part is from the output of adder 707 and is not processed by filtering unit 708. For example, the decoder allocates a picture buffer to (temporally) store output data of adder 707. Another method for the decoder is to reserve a special picture buffer in DPB 709 to keep the data from adder 707.

When the prediction parameters indicate intra prediction mode is used to derive prediction samples of the decoding block, the prediction unit 702 employs the same approach as that for intra prediction unit 206 in the encoder to determine reference samples for the intra prediction unit 704 from reconstructed neighboring samples of the decoding block. The intra prediction unit 704 gets an intra prediction mode (e.g., DC mode, Planar mode, or an angular prediction mode) and derives intra prediction samples of the decoding block using reference samples following specified process of the intra prediction mode. Note that identical derivation process of an intra prediction mode is implemented in the encoder (e.g., intra prediction unit 206) and the decoder (e.g., intra prediction unit 704). In some embodiments, if the prediction parameters indicate a matching block (including its location) in the current decoding picture (which contains the decoding block) for the decoding block, the intra prediction unit 704 uses samples in the matching block to derive the intra prediction samples of the decoding block. For example, the intra prediction unit 704 can set intra prediction samples equal to the samples in the matching block. The prediction unit 702 can set prediction samples of the decoding block equal to intra prediction samples output by the intra prediction unit 704.

The decoder 700 passes QP and quantized coefficients to the scaling unit 705 for processing the inverse quantization to get reconstructed coefficients as output. The decoder 700 feeds the reconstructed coefficients from scaling unit 705 and the transform parameter in the residual parameter (e.g., the transform parameter in output of the transform unit 208 in the encoder 200) into the transform unit 706. In some embodiments, if the residual parameter indicates skipping scaling in decoding a block, the decoder 700 guides the coefficients in the residual parameter to the transform unit 706 by bypassing the scaling unit 705.

The transform unit 706 performs transform operations on the input coefficients following a transform process specified in a standard. The transform matrix used in the transform unit 706 is the same as that used in inverse transform unit 211 in the encoder 200. The output of transform unit 706 is a reconstructed residual of the decoding block.

Generally, since only decoding process is specified in a standard, from the perspective view of a video coding standard, process and related matrix in decoding process is specified as "transform process" and "transform matrix" in a standard text. Thus, the description on the decoder names the unit implementing a transform process as "transform unit". However, this unit can also be named as the "inverse transform unit" because the decoding process can be deemed as an inverse process of encoding.

The adder 707 takes the reconstructed residual in output of transform unit 706 and the prediction samples in output of prediction unit 702 as input data. The adder 707 calculates reconstructed samples of the decoding block. The adder 707 stores the reconstructed samples into a picture buffer. For example, the decoder allocates a picture buffer to (temporally) store output data of adder 707. Another method for the decoder is to reserve a special picture buffer in DPB 709 to keep the data from adder 707.

The decoder 700 passes filtering parameter from the parsing unit 701 to the filtering unit 708. The filtering parameter for the filtering unit 708 is identical to the filtering parameter in the output of filtering unit 213 in the encoder 200. The filtering parameter includes information of one or more filters to be used, filter coefficients, and filtering control parameter. The filtering unit 708 performs filtering process using the filtering parameter on reconstructed samples of a picture stored in decoded picture buffer and outputs a decoded picture. The filtering unit 708 may include one filter or several cascading filters. For example, according to H.265/HEVC standard, the filtering unit includes two cascading filters: a deblocking filter and a sample adaptive offset (SAO) filter. The filtering unit 708 may also include neural network filters. The filtering unit 708 may start filtering reconstructed samples of a picture when reconstructed samples of all coding blocks in the picture have been stored in decoded picture buffer, which can be referred to as "picture layer filtering." In some embodiments, an alternative implementation (referred to as "block layer filtering") of picture layer filtering for filtering unit 708 is to start filtering reconstructed samples of a coding block in a picture if the reconstructed samples are not used as reference in decoding all successive coding blocks in the picture. Block layer filtering does not require filtering unit 708 to hold filtering operations until all reconstructed samples of a picture are available, and thus saves time delay among threads in a decoder.

The decoder 700 stores the decoded picture output by the filtering unit 708 in the DPB 709. In addition, the decoder 700 may perform one or more control operations on pictures in the DPB 709 according to one or more instructions output by parsing unit 701 (e.g., the time length of a picture storing in DPB 709, outputting a picture from DPB 709, and etc.).

Figure 16:
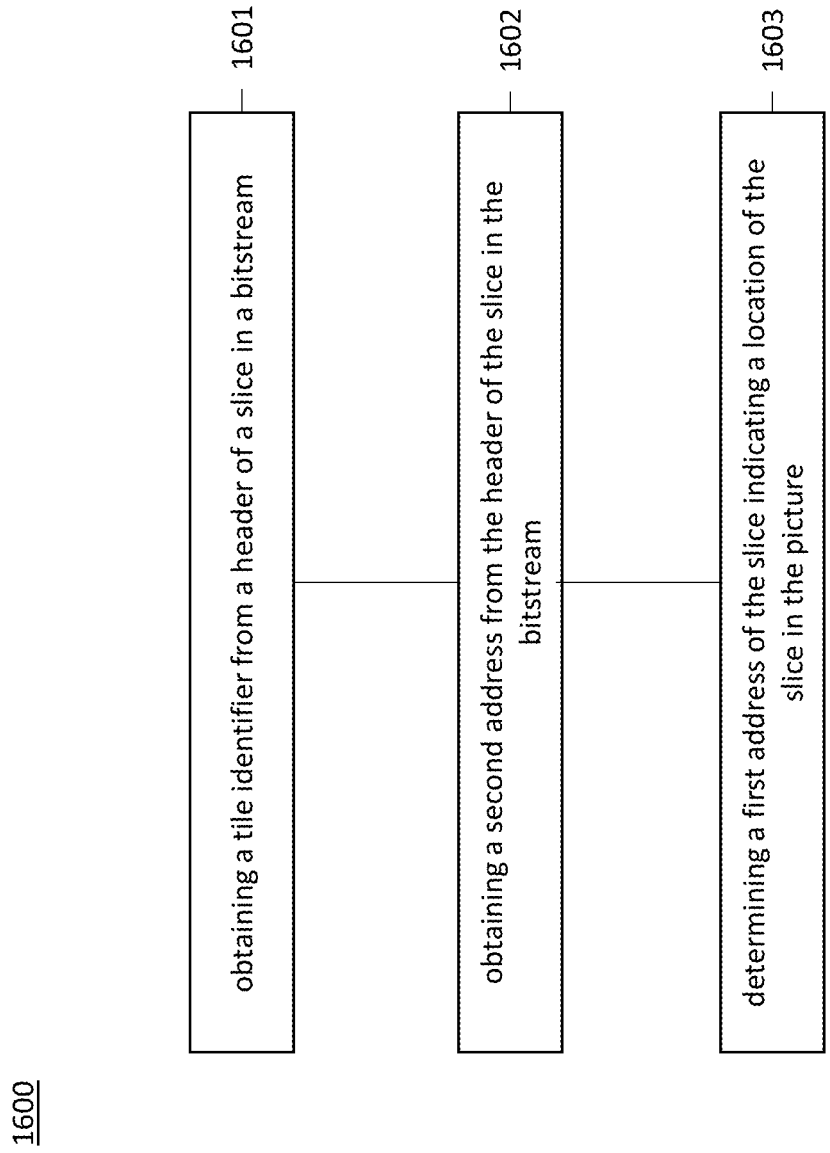
FIG. 16 is a flowchart representation of a method for decoding a picture in video or picture processing in accordance with one or more embodiments of the present technology.

FIG. 16 is a flowchart representation of a method 1600 for decoding a picture in video or picture processing in accordance with one or more embodiments of the present technology. The picture is partitioned into one or more tiles, and each of the one or more tiles is partitioned into one or more slices. The method 1600 includes, at step 1601, obtaining a tile identifier from a header of a slice in a bitstream. The tile identifier indicates a tile in which the slice resides. The method 1600 includes, at step 1602, obtaining a second address from the header of the slice in the bitstream. The second address indicates a location of the slice in the tile. The method 1600 also includes, at step 1603, determining a first address of the slice indicating a location of the slice in the picture based on the tile identifier and the second address.

Embodiment 3

Figure 8:
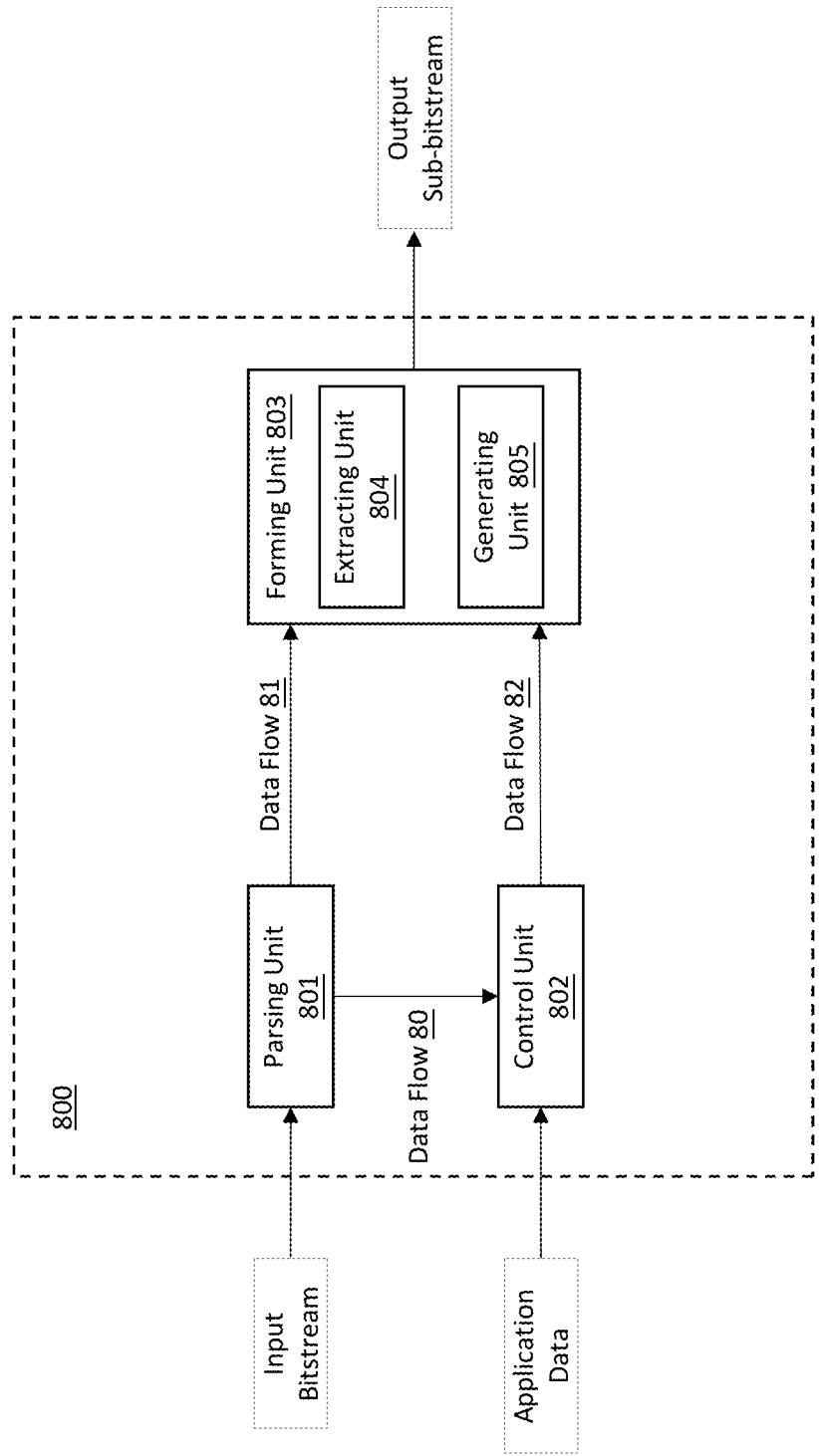
FIG. 8 shows an example of an extractor in accordance with one or more embodiments of the present technology.

FIG. 8 shows an example of an extractor 800 in accordance with one or more embodiments of the present technology. One of the inputs of the extractor is a bitstream generated by the encoder 200 in FIG. 2. Another input of the extractor is application data which indicates a target picture region for extraction. Output of the extractor is a sub-bitstream which is decodable by the decoder 700 in FIG. 7. This sub-bitstream, if further extractable, can also be an input bitstream of an extractor.

The basic function of an extractor is to form a sub-bitstream from an original bitstream. For example, a user selects a region in a high-resolution video for displaying this region on his smartphone, and the smartphone sends application data to a remote device (e.g. a remote server) or an internal processing unit (e.g. a software procedure installed on this smartphone) to request for media data corresponding to the selected region (e.g., a target picture region). An extractor (or equivalent processing unit) on the remote device or the internal processing unit extracts a sub-bitstream corresponding to the target picture region from a bitstream corresponding to the original high-resolution video.

Another example is that a Head Mounted Device (HMD) detects a current viewport of a viewer and requests for media data for rendering this viewport. Similar to the previous example, the HMD also generates application data indicating a region in a video picture covering the final rendering region of the detected viewport (e.g., a target picture region), and sends the application data to a remote device or its internal process unit. An extractor (or equivalent processing unit) on the remote device or the internal processing unit extracts a sub-bitstream corresponding to the target picture region from a bitstream corresponding to the video covering a wider rendering viewport.

In this embodiment, an example input bitstream is a bitstream generated by the encoder 200 by encoding a picture using the tile parameter and slice partitioning described above.

The parsing unit 801 parses the input bitstream to obtain a tile parameter from one or more data units (for example, a parameter set data unit) in the input bitstream. The tile parameter includes a tile partitioning parameter indicating a partitioning manner of a picture into tiles and one or more corresponding tile identifiers. The parsing unit 801 runs similar processing to that in parsing unit 701 to obtain the tile parameter. The parsing unit 801 places the tile parameter and other necessary data for determining the target tiles for extraction (e.g. picture width and height) in a data flow 80 and sends the data flow 80 to the control unit 802.

Note that the data flow here refers to input parameters and returning parameters of a function in software implementations, and/or data transmission on a bus and data sharing among storage units (also including data sharing among registers) in hardware implementations.

The parsing unit 801 parses the input bitstream to obtain a slice layer tile identifier from a slice header of a slice using similar method to that in parsing unit 701. The parsing unit 801 places the slice layer tile identifier in a data flow 81 and sends the data flow 81 to the forming unit 803. The parsing unit 801 also parses the input bitstream and forwards other data to the forming unit 803 via the data flow 81 in the process of generating a sub-bitstream when necessary. The parsing unit 801 also includes the input bitstream in the data flow 81.

The control unit 802 obtains a target picture region from its input of the application data, including the location and the size of the target picture region in a picture. The control unit 802 obtains the tile parameters and the width and height of a picture from the data flow 80. The control unit 802 employs a similar method to that in parsing unit 701 to determine the addresses and sizes of tiles in the picture, and then determines one or more target tiles located in the target picture region. The control unit 802 also obtains the target tile identifiers as the tile identifiers of the target tiles according to the tile parameter. In this example, suppose that the target picture region includes tiles 320 and 330, the control unit 802 places the target tile identifiers (e.g., 2 for tile 320 and 3 for tile 303) and the size of the target picture region (i.e. targetPicWidth and targetPicHeight) in the data flow 82.

The forming unit 803 receives the data flow 81 and 82 and extracts data units from the input bitstream forwarded in data flow 81. The forming unit 803 also generates a new parameter sets according to the new parameters for the target picture region and then forms a sub-bitstream by composing the extracted data units and new parameter sets. The forming unit 803 includes the extracting unit 804 and the generating unit 805. When the extracting unit 804 detects a slice layer tile identifier that is equal to one of the target tile identifiers, the extracting unit 804 extracts one or more data units of this slice. Referring back to FIG. 3 again as an example, the extracting unit 804 extracts slice data units of slices 3200, 3201 and 3203, whose slice layer tile identifier is equal to 2. The extracting unit 804 also extracts slice data units of slices 3300 and 3301, whose slice layer tile identifier is equal to 3. In this example, the extracting unit 804 sets targetPicWidth to be equal to a width of sum of the widths of tile 320 and 330, and sets targetPicHeight to be equal to a height of tile 320 (or tile 330).

The generating unit 805 generates one or more new parameter sets data unit to signal new features of the target picture region and the sub-bitstream. For example, the generating unit 805 sets the corresponding syntax elements in the parameter set to indicate picture width and height of the target picture region (e.g., targetPicWidth and targetPicHeight) according to a video coding standard. The generating unit 805 also sets the corresponding syntax elements in the parameter set to indicate the operating points of the extracted sub-bitstream.

The generating unit 805 sets the tile parameter related syntax elements in the new parameter sets using similar method adopted by the entropy coding unit 215. For example, the generating unit 805 sets the value of syntax element in FIG. 5A as:

tiles_enable_flag=1 because there are two tiles in the target picture region which is a decoded picture obtained by decoding the extracted sub-bitstream using the decoder in FIG. 7. The generating unit 805 sets the values of syntax elements in FIG. 5F according to tile partitioning parameter of the target picture region (e.g., uniformly partitioning into 2 tile columns, or equivalently combining two tiles side by side to form the target picture region) as:

num_tile_columns_minus1=1;
num_tile_rows_minus1=0;
uniform_spacing_flag=1.

The generating unit 805 sets the values of syntax elements in FIG. 5G according to the target tile identifiers (e.g., 2 and 3) as:

tile_id_present_flag=1;
tile_id_ascending_flag=1;
tile_id_starting_value=2.

Note that "target tile parameter" can be employed to collectively refer to a target tile partitioning parameter indicating a combining manner of the target tiles to form the target picture region and the target tile identifiers of the target tiles.

The forming unit 803 assembles the data units, including slice data units extracted from the bitstream in the data flow 81 (as well as other associated data units) and data units of the new parameter sets, to form a sub-bitstream according to a specified bitstream structure of the video coding standard. Output of the forming unit 803 is the sub-bitstream, which is decodable by the decoder 700 in FIG. 7.

Moreover, as the sub-bitstream in this example contains two tiles, the sub-bitstream is still extractable and can be an input of the extractor, for example, with a target picture region set covering the tile with its tile identifier of 2.

Using the techniques described above, no rewriting operations are needed in processing the slice data units, and the complex determination of which slice is in the target tile by comparing slice address and tile coverage region in a picture is eliminated by simply comparing the slice layer tile identifier and target tile identifier. Therefore, the drawbacks in the existing methods are solved by using the encoder to generate an original bitstream, the extractor to obtain a sub-bitstream, and the decoder to decode the sub-bitstream (as well as the original bitstream).

FIG. 17 is a flowchart representation of a method 1700 for processing one or more bitstreams in video or picture processing in accordance with one or more embodiments of the present technology. The method 1700 includes, at step 1701, determining one or more target tile identifiers identifying one or more target tiles located in a target region of the picture. The one or more target tile identifiers are included in the one or more bitstreams. The method 1700 includes, at step 1702, obtaining, from each of the one or more bitstreams, a tile identifier from a header of a slice. The tile identifier indicates a tile in which the slice resides. The method 1700 includes, at step 1703, composing a sub-bitstream from the bitstream based on a determination that the tile identifier from the header of the slice is equal to one of the one or more target tile identifiers. The method 1700 includes, at step 1704, determining a target tile parameter corresponding to the target region. The target tile parameter includes a target tile partitioning parameter indicating a partitioning manner of the one or more target tiles. The target tile parameter further includes the one or more target tile identifiers. The method 1700 also includes, at step 1705, encoding the target tile parameter in a data unit of the sub-bitstream.

Embodiment 4

Figure 9:
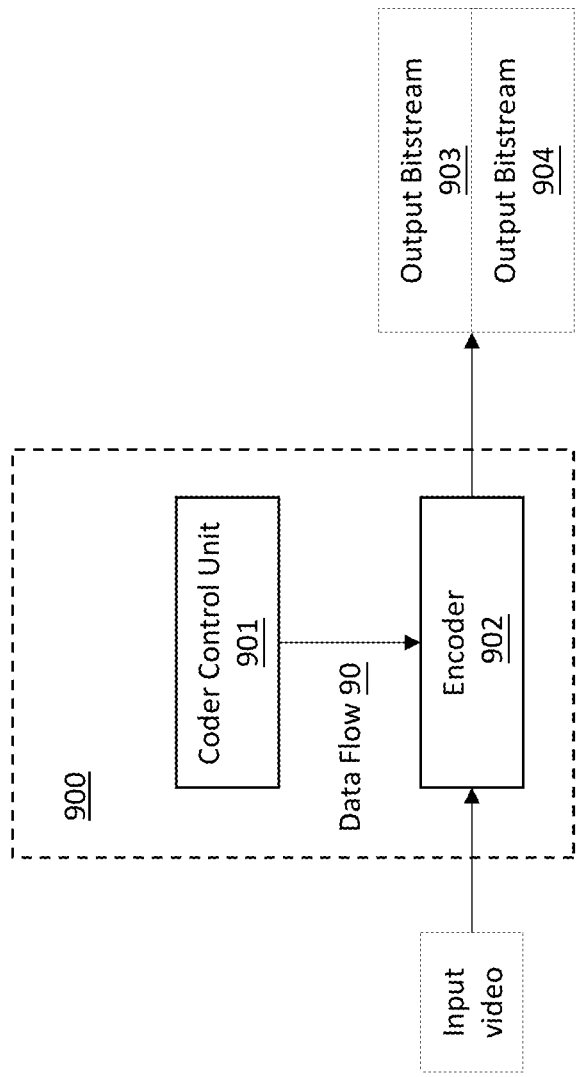
FIG. 9 depicts an example of a source device that implements the techniques in accordance with one or more embodiments of the present technology.

FIG. 9 depicts an example of a source device 900 that implements the techniques in accordance with one or more embodiments of the present technology.

The coder control unit 901 generates an encoder configuration and passes it to the encoder 902 via the data flow 90. An encoder configuration indicates a tile partitioning manner and one or more encoding parameters in encoding the input video. The encoder 902 is implemented in accordance to the example encoder depicted in FIG. 2. The encoder 902 encodes an input video using an encoder configuration in the data flow 90 to generate an output bitstream. The output bitstream is decodable by the example decoder depicted in FIG. 7.

In some embodiments, the source device 900 may generate multiple independent bitstreams using different encoder configurations for encoding the same input video. Such bitstreams may have multiple quality features that are different from each other, which are the results of different sets in the corresponding multiple encoder configurations (e.g., a quantization parameter used for the picture, a resolution of the picture, a quantization parameter used for a tile and a resolution of a tile, and etc.).

For example, to facilitate viewport-based streaming of an omnidirectional 360-degree video, a source device 900 may generate multiple bitstreams with different coding qualities (e.g., using different quantization parameters). When HMD requires a bitstream corresponding to the viewport of a viewer's current focusing point, a media server may form a bitstream that contains the high-quality region covering the current viewport for rendering on HMD and other relative low-quality regions for "temporal" rendering of other viewports when viewer shifts to another viewport. When HMD detects that the viewer is focusing on the new viewport, HMD sends a request to the server and the server generates a new bitstream containing a high-quality region covering the current shifted viewport for rendering on HMD and sends this new bitstream to HMD.

In this case, the coder control unit 901 sets two encoder configurations. The tile partitioning manner in the two encoder configurations are the same, but the quantization parameters are different. The encoder 902 encodes an input video separately using the two configurations to get two bitstreams 903 and 904.

In generating bitstream 903, the coder control unit 901 sets a high quantization parameter in the first encoder configuration, and pictures obtained by decoding bitstream 903 is of a relative low perceptual quality.

In generating bitstream 904, coder control unit 901 sets a low quantization parameter in the second encoder configuration, and pictures obtained by decoding bitstream 904 is of a relative high perceptual quality.

To support extracting a sub-bitstream by combining data units from bitstreams 903 and 904, the encoder 902 assigns different tile identifiers in generating multiple bitstreams. For example, the encoder 902 employs the tile parameter in FIG. 3 and the tile parameter in FIG. 4 (including tile partitioning manner and corresponding assignment of tile identifiers) in generating bitstream 903 and bitstream 904. That is, the tile identifiers for the 8 tiles in a picture in bitstream 903 is 0, 1, 2, 3, 4, 5, 6 and 7, and the tile identifiers for the 8 tiles in a picture in bitstream 904 is 10, 11, 12, 13, 14, 15, 16 and 17.

Figure 10:
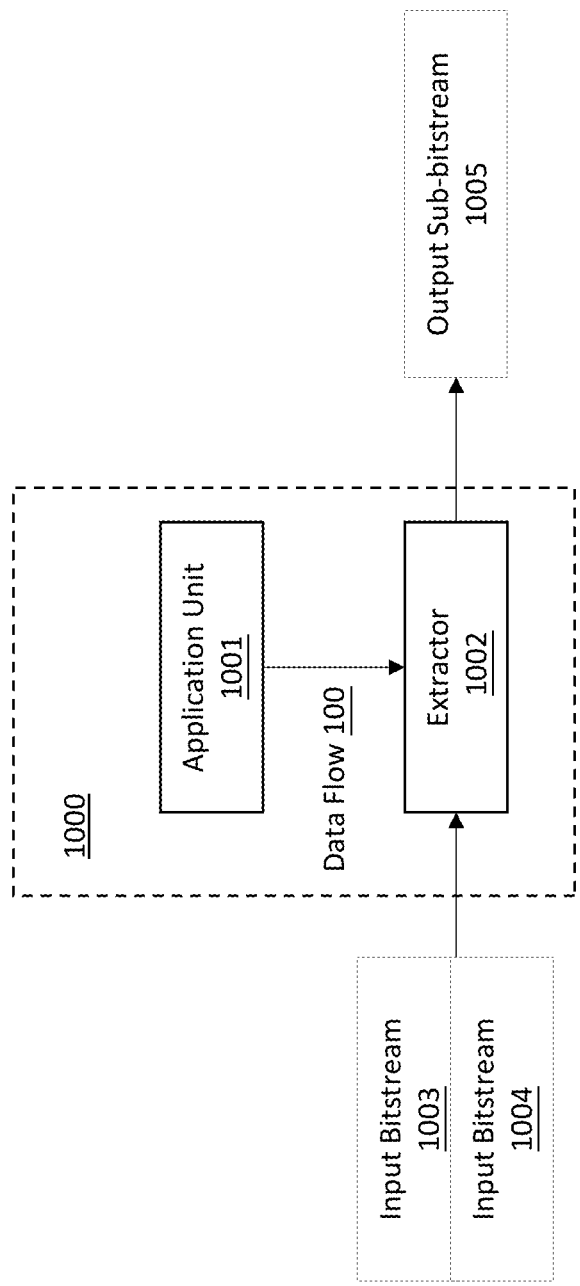
FIG. 10 shows an example of a media device in accordance with one or more embodiments of the present technology.

FIG. 10 shows an example of a media device 1000 in accordance with one or more embodiments of the present technology. The media device 1000 includes an application unit 1001 and an extractor 1002.

The application unit 1001 collects application requirements and generates application data. The application requirements can be, for example, the selection of a region in a high-resolution picture by a user, the viewport detected by an HMD, and etc. The generated application data are the same as those described in FIG. 8 as the input of control unit 802, which includes a target picture region for extraction. The generated application data may also include the location of the current focusing viewport in a picture. The application unit 1001 passes the generated application data via data flow 100.

The extractor 1002 is implemented in accordance with the extractor illustrated in FIG. 8, with an additional ability of processing multiple input bitstreams. The extractor 1002 includes the same units and data flows as shown in FIG. 8. For example, when an input of extractor 1002 is a single bitstream, the extractor 1002 processes the single bitstream in the same way as described above.

As another example, the input of the extractor 1002 includes multiple bitstreams. For example, two bitstreams 903 and 904 generated by the source device 900 now become the input bitstream 1003 and the input bitstream 1004, respectively.

The parsing unit 801 in the extractor 1002 parses the multiple input bitstreams to obtain multiple tile parameters from data units (for example, parameter set data units) in the multiple input bitstreams. Each of the tile parameter includes a tile partitioning parameter indicating a partitioning manner of a picture into tiles and one or more tile identifiers correspondingly. The parsing unit 801 in the extractor 1002 runs a similar process as the parsing unit 701 to obtain the tile parameters. The parsing unit 801 places the tile parameters and other necessary data for determining the target tiles for extraction (e.g. picture width and height) obtained from input bitstreams 1003 and 1004 in the data flow 80 in the extractor 1002 and sends the data flow 80 to the control unit 802 in the extractor 1002.

The parsing unit 801 in the extractor 1002 parses each of the multiple input bitstreams to obtain a slice layer tile identifier from a slice header of a slice using similar method to that in parsing unit 701. The parsing unit 801 in the extractor 1002 puts the slice layer tile identifiers obtained from input bitstreams 1003 and 1004 in the data flow 81 and sends the data flow 81 to the forming unit 803 in the extractor 1002. The parsing unit 801 in the extractor 1002 also parses each of the multiple input bitstreams and forwards other data to the forming unit 803 in the extractor 1002 via the data flow 81 in the process of generating a sub-bitstream when necessary. The parsing unit 801 in the extractor 1002 also includes the multiple input bitstreams in the data flow 81.

The control unit 802 in the extractor 1002 obtains a target picture region from the data flow 100, including the location and the size of the target picture region in a picture and maybe also the location of the current focusing viewport in a picture. The control unit 802 in the extractor 1002 obtains the tile parameters and the width and height of a picture from the data flow 80. The control unit 802 in the extractor 1002 employs a similar method as used by the parsing unit 701 to determine the addresses and sizes of tiles in the picture, and then determines one or more target tiles located in the target picture region. The control unit 802 also determines the target tile identifiers as the tile identifiers of the target tiles according to the tile parameter. In this example, suppose that the current focusing viewport in a picture is the right half of the picture, the control unit 802 in the extractor 1002 determines that the target picture region includes the right half of a picture in input bitstream 1004 (for high perceptual quality) and the left half of a picture in input bitstream 1003 (for low perceptual quality to save transmission bits). Thus, the final extracted picture from the multiple bitstreams includes tiles 300, 310, 340 and 350 as illustrated in FIG. 3, and tiles 4120, 4130, 4160 and 4170 as illustrated in FIG. 4. The control unit 802 in the extractor 1002 places the target tile identifiers (e.g., 0, 1, 4 and 5 for tiles in input bitstream 1003, and 12, 13, 16 and 17 for tiles in input bitstream 1004) and size of the target picture region (e.g., targetPicWidth and targetPicHeight) in the data flow 82. In this example, the control unit 802 in the extractor 1002 sets targetPicWidth and targetPicHeight to be equal to a width and a height of the picture, respectively.

Figure 11:
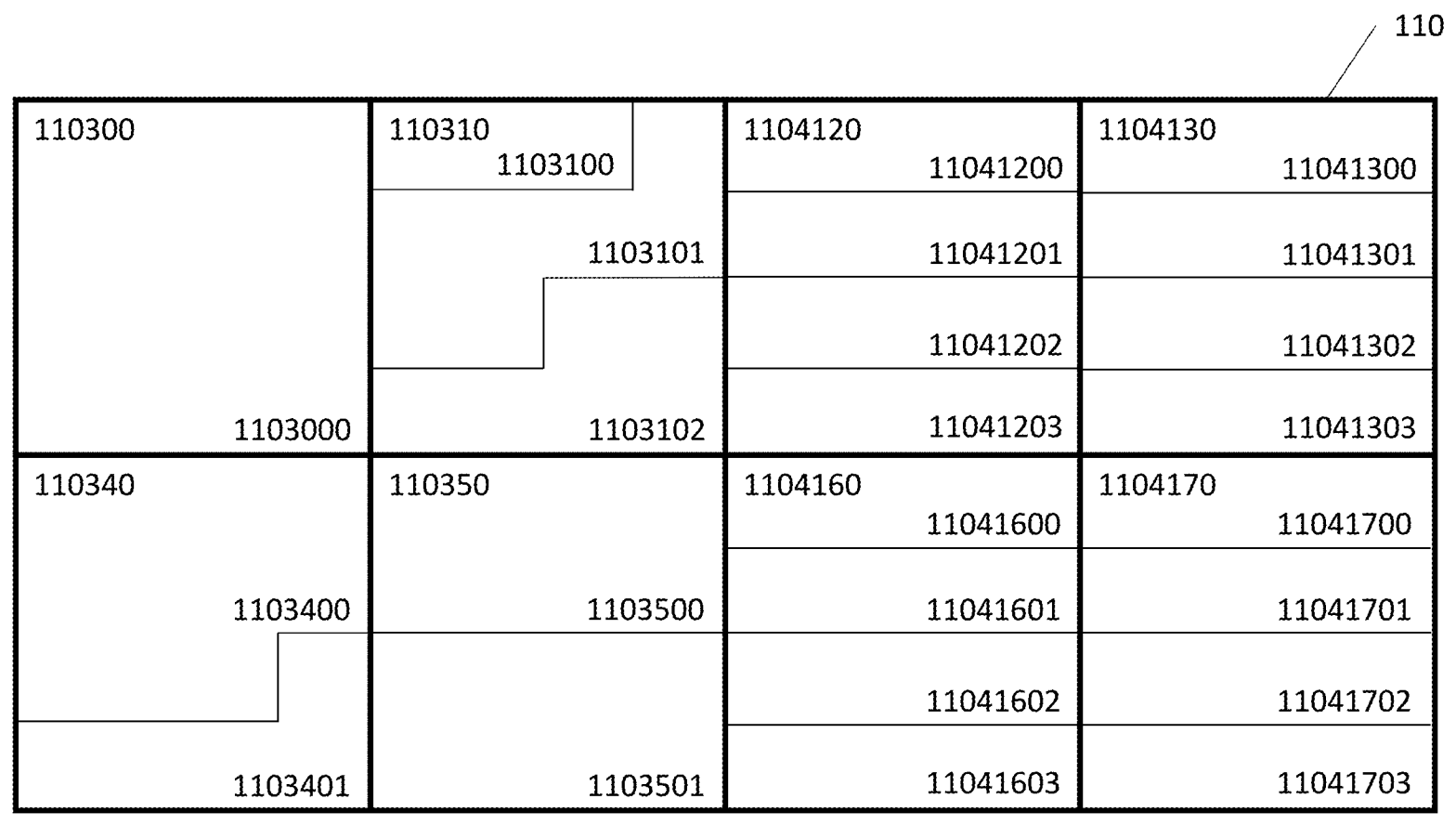

The control unit 802 in the extractor 1002 also places the combining manner of the 8 tiles to form a picture in the data flow 82. Equivalently, such combining manner may also indicate a partitioning manner of a picture into tiles. FIG. 11 shows an example of tiles and slices partitioning of a picture in a sub-bitstream in accordance with one or more embodiments of the present technology. Picture 110 is a picture obtained by decoding the sub-bitstream (e.g. output bitstream 1005). Tiles 110300, 110310, 110340 and 110350 are tiles 300, 310, 340 and 350 (with equal tile identifiers, respectively) illustrated in FIG. 3 from input bitstream 1003. Tiles 1104120, 1104130, 1104160, 1104170 are tiles 4120, 4130, 4160 and 4170 (with equal tile identifiers, respectively) illustrated in FIG. 4. The control unit 802 in the extractor 1002 places the tile partitioning manner and corresponding tile identifiers, for example, in a form of tile parameter of picture 110, in the data flow 82.

The forming unit 803 in the extractor 1002 receives the data flows 81 and 82, extracts data units from the multiple input bitstreams forwarded in the data flow 81, generates new parameter sets according to the new parameters for the target picture region, and then forms a sub-bitstream by composing the extracted data units and new parameter sets. The forming unit 803 in the extractor 1002 includes an extracting unit 804 and a generating unit 805. When the extracting unit 804 detects a slice layer tile identifier equal to one of the target tile identifiers, the extracting unit 804 extracts one or more data units of this slice. In this example, the extracting unit 804 extracts slice data units of slices 3000, 3100, 3101, 3102, 3400, 3401, 3500 and 3501 as illustrated in FIG. 3, whose slice layer tile identifier is equal to one of 0, 1, 4 and 5, from input bitstream 1003. The extracting unit 804 also extracts slices 41200, 41201, 41202, 41203, 41300, 41301, 41302, 41303, 41600, 41601, 41602, 41603, 41700, 41701, 41702 and 41703 as illustrated in FIG. 4, whose slice layer tile identifier is equal to one of 12, 13, 16 and 17, from input bitstream 1004. The corresponding slices in picture 110 are slices 1103000, 1103100, 1103101, 1103102, 1103400, 1103401, 1103500 and 1103501 in the left half of picture 110 and 11041200, 11041201, 11041202, 11041203, 11041300, 11041301, 11041302, 11041303, 11041600, 11041601, 11041602, 11041603, 11041700, 11041701, 11041702 and 11041703 in the right half of picture 110, as illustrated in FIG. 11.

The generating unit 805 generates one or more new parameter sets data unit to indicate the new features of the target picture region (e.g., picture 110) and the sub-bitstream (e.g., output bitstream 1005). For example, the generating unit 805 sets corresponding syntax elements in the parameter set to indicate the picture width and height of the target picture region (e.g., targetPicWidth and targetPicHeight) according to a video coding standard. The generating unit 805 also sets corresponding syntax elements in the parameter set to indicate the operating points of the sub-bitstream.

The generating unit 805 sets tile parameter related syntax elements in the new parameter sets using a similar method used by the entropy coding unit 215. For example, the generating unit 805 sets the value of syntax element in FIG. 5A as:

tiles_enable_flag=1 because there are 8 tiles in picture 110, which is a decoded picture obtained by decoding output bitstream 1005 using the decoder in FIG. 7. The generating unit 805 sets the values of syntax elements in FIG. 5F according to tile partitioning parameter of picture 110 (e.g., uniformly partitioning into 4 tile columns and 2 tile rows) as:

num_tile_columns_minus1=3;
num_tile_rows_minus1=1;
uniform_spacing_flag=1.

The generating unit 805 sets the values of syntax elements in FIG. 5G according to the target tile identifiers in picture 110 as:

tile_id_present_flag=1;
tile_id_ascending_flag=0;
tile_id[0]=0 (tile 110300 in FIG. 11)
tile_id[1]=1 (tile 110310 in FIG. 11)
tile_id[2]=12 (tile 1104120 in FIG. 11)
tile_id[3]=13 (tile 1104130 in FIG. 11)
tile_id[4]=4 (tile 110340 in FIG. 11)

tile_id[5]=5 (tile 110350 in FIG. 11)
tile_id[6]=16 (tile 1104160 in FIG. 11)
tile_id[7]=17 (tile 1104170 in FIG. 11)

Note that "target tile parameter" can be employed to collectively refer to a target tile partitioning parameter indicating a combining manner of the target tiles to form the target picture region and the target tile identifiers of the target tiles.

The forming unit 803 in the extractor 1002 assembles the data units, including slice data units extracted from the multiple input bitstreams in the data flow 81 (as well as other associated data units) and data units of the new parameter sets, to form a sub-bitstream according to a specified bitstream structure of the video coding standard. Output of the forming unit 803 in the extractor 1002 is output bitstream 1005, which is decodable by the decoder 700 in FIG. 7.

Moreover, as output bitstream 1005 in this example contains 8 tiles, output bitstream 1005 is still extractable and can be an input of the extractor illustrated in FIG. 8 or FIG. 10.

Embodiment 5

Figure 12:
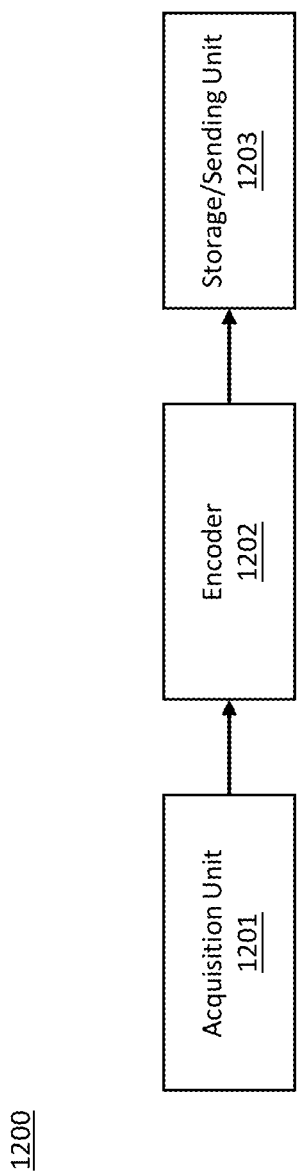
FIG. 12 shows an example device including at least a video encoder or picture encoder in accordance with one or more embodiments of the present technology.

FIG. 12 shows an example device 1200 including at least a video encoder or picture encoder in accordance with one or more embodiments of the present technology. In FIG. 12, the acquisition unit 1201 captures video and picture. The acquisition unit 1201 may be equipped with one or more cameras for shooting a video or a picture of nature scene. In some embodiments, the acquisition unit 1201 may be implemented with a camera to get depth video or depth picture. In some embodiments, the acquisition unit 1201 may include a component of an infrared camera. In some embodiments, the acquisition unit 1201 may be configured with a remote sensing camera. The acquisition unit 1201 may also be an apparatus or a device of generating a video or a picture by scanning an object using radiation.

In some embodiments, the acquisition unit 1201 may perform pre-processing on video or picture (e.g., automatic white balance, automatic focusing, automatic exposure, backlight compensation, sharpening, denoising, stitching, up-sampling/down sampling, frame-rate conversion, virtual view synthesis, and etc.).

In some embodiments, the acquisition unit 1201 may also receive a video or picture from another device or processing unit. For example, the acquisition unit 1201 can be a component unit in a transcoder. The transcoder feeds one or more decoded (or partial decoded) pictures to the acquisition unit 1201. As another example, the acquisition unit 1201 gets a video or picture from another device via a data link to that device.

Note that the acquisition unit 1201 may be used to capture other types of media information besides video and picture (e.g., audio signal). The acquisition unit 1201 may also receive artificial information (e.g., character, text, computer-generated video or picture, and etc.).

The encoder 1202 is implemented in accordance with one or more embodiments of the present technology. Input of the encoder 1202 is the video or picture outputted by the acquisition unit 1201. The encoder 1202 encodes the video or picture and outputs generated a video or picture bitstream.

The storage/sending unit 1203 receives the video or picture bitstream from the encoder 1202, and performs system layer processing on the bitstream. For example, the storage/sending unit 1203 encapsulates the bitstream according to the transport standard and the media file format (e.g., MPEG-2 TS, ISOBMFF, DASH, MMT, and etc.). The storage/sending unit 1203 stores the transport stream or the media file obtained after encapsulation in memory or disk of the first example device, or sends the transport stream or the media file via wireline or wireless networks.

Note that besides the video or picture bitstream from the encoder 1202, input of the storage/sending unit 1203 may also include audio, text, image, graphic, and etc. The storage/sending unit 1203 generates a transport or a media file by encapsulating such different types of media bitstreams.

The storage/sending unit 1203 may also include an extractor implemented in accordance with one or more embodiments of the present technology. The storage/sending unit 1203 may generate a sub-bitstream for storage or transmission.

The example device 1200 described in this embodiment can be a device capable of generating or processing a video (or picture) bitstream in applications of video communications (e.g., mobile phone, computer, media server, portable mobile terminal, digital camera, broadcasting device, CDN (content distribution network) device, surveillance camera, video conference device, and etc.).

Embodiment 6

Figure 13:
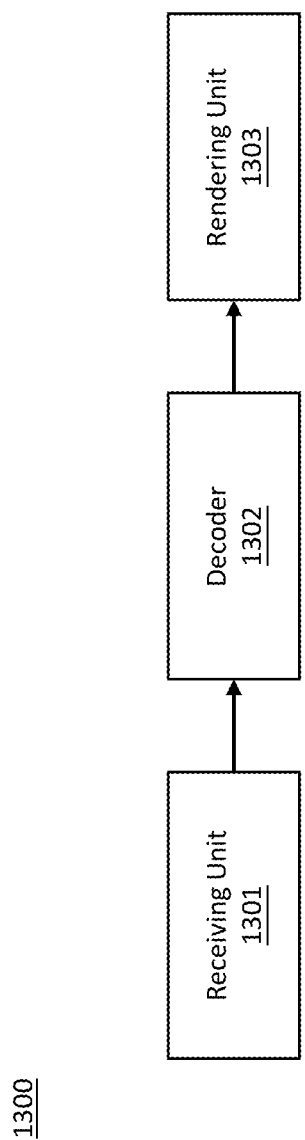
FIG. 13 shows another example device including at least an example decoder in accordance with one or more embodiments of the present technology.

FIG. 13 shows another example device 1300 including at least an example decoder in accordance with one or more embodiments of the present technology.

The receiving unit 1301 receives video or picture bitstream by obtaining bitstream from wireline or wireless network, by reading memory or disk in an electronic device, or by fetching data from other device via a data link. The input of the receiving unit 1301 may also include a transport stream or a media file containing a video or picture bitstream. The receiving unit 1301 extracts the video or picture bitstream from the transport stream or the media file according to specification of transport stream or media file format.

The receiving unit 1301 may also include an extractor implemented in accordance with one or more embodiments of the present technology. The receiving unit 1301 may generate a sub-bitstream by extracting one or more received bitstreams for decoding and rendering.

The receiving unit 1301 outputs and passes the video or picture bitstream to the decoder 1302. Note that besides video or picture bitstream, output of the receiving unit 1301 may also include an audio bitstream, a character, text, image, graphic and etc. The receiving unit 1301 passes the output to corresponding processing units in the example device 1300. For example, the receiving unit 1301 passes the output audio bitstream to audio decoder in this device 1300.

The input of the encoder 1302 is the video or picture bitstream outputted by the receiving unit 1301. The decoder 1302 decodes the video or picture bitstream and outputs decoded video or picture.

The rendering unit 1303 receives the decoded video or picture from the decoder 1302. The rendering unit 1303 presents the decoded video or picture to viewer. The rendering unit 1303 may be a component of the example device 1300 (e.g., a screen). The rendering unit 1303 may also be a separate device from the example device 1300 with a data link to the example device 1300 (e.g., a projector, a monitor, a TV set, and etc.). In some embodiments, the rendering unit 1303 performs post-processing on the decoded video or picture before presenting it to viewer (e.g., automatic white balance, automatic focusing, automatic exposure, backlight compensation, sharpening, denoising, stitching, up-sampling/down sampling, frame-rate conversion, virtual view synthesis, and etc.).

Note that besides the decoded video or picture, input of the rendering unit 1303 can include other media data from one or more units of the second example device (e.g., audio, character, text, image, graphic, and etc.). The input of the rendering unit 1303 may also include artificial data (e.g., lines and marks drawn by a local teacher on slides for attracting attention in remote education application). The rendering unit 1303 includes the different types of media together and then presented the composition to viewer.

The example device 1300 described in this embodiment can be a device capable of decoding or processing a video (or picture) bitstream in applications of video communication (e.g., mobile phone, computer, set-top box, TV set, HMD, monitor, media server, portable mobile terminal, digital camera, broadcasting device, content distribution network device, surveillance, video conference device, and etc.).

Embodiment 7

FIG. 14 shows an example electronic system in accordance with one or more embodiments of the present technology. The system 1400 includes a service device 1401, a storage medium/transport networks 1402, and a destination device 1403. The service device 1401 can be implemented in accordance with Embodiment 5 described above. The storage medium/transport networks 1402 may include internal memory resource of a device or electronic system, external memory resource that is accessible via a data link, and/or data transmission network including wireline and/or wireless networks. The storage medium/transport networks 1402 provides storage resource or data transmission network for storage/sending unit 1203 in service device 1401.

The destination device 1403 can be implemented in accordance with Embodiment 6 described above. For example, the receiving unit 1301 in the destination device 1403 receives a video or picture bitstream, a transport stream containing video or picture bitstream or a media file containing video or picture bitstream from storage medium/transport networks 1402.

The electronic system 1400 described in this embodiment can be a device or system capable of generating, storing or transporting, and decoding a video (or picture) bitstream in applications of video communication (e.g., mobile phone, computer, IPTV systems, OTT systems, multimedia systems on Internet, digital TV broadcasting system, video surveillance system, potable mobile terminal, digital camera, video conference systems, and etc).

It is noted that the described implementations can be applied to any other similar concepts and region definitions for partitioning a picture by replacing "tile" and "slice" with counterpart concepts and region definitions. For example, methods in this disclosure will be applied to H.264/AVC codec by replacing "tile" with "slice group" specified in H.264/AVC standard.

It will be appreciated that the present document discloses techniques that can be applied to various embodiments in different stages (e.g., encoding, decoding, extracting) of video or picture processing to avoid redundant writes of the slice addresses and minimize computational cost of determining slice locations, thereby increasing the efficiency of accessing individual slices to assist resynchronization, parallel processing, region-of-interest coding and streaming, packetized transmission, and/or viewport dependent streaming.

In example aspect, a method for video or picture processing includes partitioning a picture into one or more tiles, and generating one or more bitstreams using one or more configurations based on the one or more tiles. Generating each of the one or more bitstreams includes partitioning each of the one or more tiles into one or more slices, and performing, for each slice among the one or more slices: a first encoding step to encode a tile identifier in a header of the slice, and a second encoding step to encode, in the header of the slice, a second address of the slice that indicates a location of the slice in the tile. The tile identifier indicates a tile in which the slice resides. The second address is determined based on a first address of the slice that indicates a location of the slice in the picture and an address of the tile.

In some embodiments, generating each of the one or more bitstreams comprises encoding a tile parameter in a data unit of the picture. The tile parameter includes a tile partitioning parameter indicating a partitioning manner of the one or more tiles in the picture, and the tile parameter further includes tile identifiers identifying each of the one or more tiles. In some embodiments, the data unit includes a data unit of a parameter set.

In some embodiments, the first address of the slice includes a location of a first sample of the slice in the picture. In some embodiments, the first address of the slice includes an ordering number of a first coding block of the tile in the picture.

In some embodiments, the second address includes a location of a first sample of the slice in the tile. In some implementations, the second address includes a coordinate offset between the location of the first sample of the slice and a location of a first sample of the tile. In some embodiments, the second address includes an ordering number of a first coding block of the slice in the tile. In some embodiments, the ordering number of the first coding block of the slice is determined based on a scanning order of coding blocks. In some implementations, the scanning order includes a raster scanning order.

In some embodiments, the one or more configurations include at least one parameter that differs in value, the one parameter including: a quantization parameter for the picture, a resolution of the picture, a quantization parameter for the one or more tiles, or a resolution of the one or more tiles.

In another exemplary aspect, a method for decoding a picture in video or picture processing is described. The picture is partitioned into one or more tiles, and each of the one or more tiles is partitioned into one or more slices. The method includes obtaining a tile identifier from a header of a slice in a bitstream, wherein the tile identifier indicates a tile in which the slice resides; obtaining a second address from the header of the slice in the bitstream, wherein the second address indicates a location of the slice in the tile; and determining a first address of the slice indicating a location of the slice in the picture based on the tile identifier and the second address.

In some embodiments, the method includes obtaining a tile parameter from a data unit of the picture in the bitstream. The tile parameter includes a tile partitioning parameter indicating a partitioning manner of the one or more tiles, and the tile parameter further includes tile identifiers identifying each of the one or more tiles. In some embodiments, the data unit includes a data unit of a parameter set.

In some embodiments, the first address of the slice includes a location of a first sample of the slice in the picture. In some embodiments, the first address of the slice includes an ordering number of a first coding block of the tile in the picture.

In some embodiments, the second address includes a location of a first sample of the slice in the tile. In some implementations, the second address includes a coordinate offset between the location of the first sample of the slice and a location of a first sample of the tile. In some embodiments, the second address includes an ordering number of a first coding block of the slice in the tile. In some embodiments, the ordering number of the first coding block of the slice is determined based on a scanning order of coding blocks. In some implementations, the scanning order includes a raster scanning order.

In another exemplary aspect, an apparatus for decoding a picture in video or picture processing is described. The apparatus includes a parsing unit configured to implement the above decoding method.

In another exemplary aspect, a method for processing one or more bitstream of a video or picture is described. The picture is partitioned into one or more tiles, and each of the one or more tiles is partitioned into one or more slices. The method includes determining one or more target tile identifiers identifying one or more target tiles located in a target region of the picture. The one or more target tile identifiers are included in the one or more bitstreams. The method includes obtaining, from each of the one or more bitstreams, a tile identifier from a header of a slice. The tile identifier indicates a tile in which the slice resides. The method includes composing a sub-bitstream based on a determination that the tile identifier from the header of the slice is equal to one of the one or more target tile identifiers and determining a target tile parameter corresponding to the target region. The target tile parameter includes a target tile partitioning parameter indicating a partitioning manner of the one or more target tiles, and the target tile parameter further includes the one or more target tile identifiers. The method also includes encoding the target tile parameter in a data unit of the sub-bitstream.

In some embodiments, the data unit includes a data unit of a parameter set. In some embodiments, the method includes parsing the one or more bitstreams to obtain one or more tile parameters. Each tile parameter includes a tile parameter indicating a partitioning manner of the one or more tiles in the picture, and the tile parameter further includes tile identifiers identifying each of the one or more tiles.

In another exemplary aspect, an apparatus for video or picture processing includes a coder control unit configured to generate one or more configurations, and an encoder configured to receive the one or more configurations from the coder control unit for generating one or more bitstreams. The encoder includes a partition unit that is configured to partition a picture into one or more tiles and partition each of the one or more tiles into one or more slices. The partition unit is further configured to perform, for each slice among the one or more slices, determining a tile identifier that indicates a tile in which the slice resides, and determining a second address of the slice that indicates a location of the slice in the tile. The second address is determined based on a first address of the slice that indicates a location of the slice in the picture and an address of the tile.

In some embodiments, the partition unit is configured to determine a tile parameter that includes a tile partitioning parameter indicating a partitioning manner of the one or more tiles in the picture, and the tile parameter further includes tile identifiers identifying each of the one or more tiles.

In some embodiments, the encoder includes an encoding unit (e.g., the entropy coding unit 215 as described above) configured to receive, from the partition unit, the tile parameter, the tile identifier for each of the one or more slices, and the second address of the slice for each of the one or more slices; encode the tile parameter in a data unit of the picture; encode the tile identifier in a header of each of the one or more slices; and encode the second address of the slice in the header of each of the one or more slices. In some implementations, the data unit includes a data unit of a parameter set.

In some embodiments, the first address of the slice includes a location of a first sample of the slice in the picture. In some embodiments, the first address of the slice includes an ordering number of a first coding block of the tile in the picture.

In some embodiments, the second address includes a location of a first sample of the slice in the tile. In some implementations, the second address includes a coordinate offset between the location of the first sample of the slice and a location of a first sample of the tile. In some embodiments, the second address includes an ordering number of a first coding block of the slice in the tile. In some embodiments, the ordering number of the first coding block of the slice is determined based on a scanning order of coding blocks. In some implementations, the scanning order includes a raster scanning order.

In some embodiments, the one or more configurations include at least one parameter that differs in value, the one parameter including: a quantization parameter for the picture, a resolution of the picture, a quantization parameter for the one or more tiles, or a resolution of the one or more tiles.

In another exemplary aspect, an apparatus for processing one or more bitstreams of a video or picture is described. The picture is partitioned into one or more tiles, and each of the one or more tiles is partitioned into one or more slices. The apparatus includes a control unit configured to determine one or more target tile identifiers identifying one or more target tiles located in a target region of the picture. The one or more target tile identifiers are included in the one or more bitstreams. The apparatus includes a parsing unit configured to obtain, from each of the one or more bitstreams, a tile identifier from a header of a slice. The tile identifier indicates a tile in which the slice resides. The apparatus includes a forming unit configured to compose a sub-bitstream based on a determination that the tile identifier from the header of the slice is equal to one of the one or more target tile identifiers; determine a target tile parameter corresponding to the target region, wherein the target tile parameter includes a target tile partitioning parameter indicating a partitioning manner of the one or more target tiles, the target tile parameter further including the one or more target tile identifiers; and encode the target tile parameter in a data unit of the sub-bitstream.

In some embodiments, the data unit includes a data unit of a parameter set. In some embodiments, the parsing unit is configured to parse the one or more bitstreams to obtain one or more tile parameters. Each tile parameter includes a tile parameter indicating a partitioning manner of the one or more tiles in the picture, and the tile parameter further includes tile identifiers identifying each of the one or more tiles.

In yet another example aspect, a computer-program storage medium is disclosed. The computer-program storage medium includes code stored thereon. The code, when executed by a processor, causes the processor to implement a described method.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video or picture processing, comprising:
   partitioning a picture into a plurality of tiles; and
   generating one or more bitstreams using one or more configurations based on the plurality of tiles, wherein generating each of the one or more bitstreams comprises:
   partitioning each of the plurality of tiles into a plurality of slices, and
   performing, for each slice among the plurality of slices:
   a first encoding step to encode a tile identifier in a header of the slice, wherein the tile identifier indicates a tile in which the slice resides, and
   a second encoding step to encode, in the header of the slice, a second address of the slice that indicates a location of the slice in the tile, wherein the second address is determined based on a first address of the slice that indicates a location of the slice in the picture and an address of the tile.

2. The method of claim 1, wherein generating each of the one or more bitstreams comprises:
   encoding a tile parameter in a data unit of the picture, wherein the tile parameter includes a tile partitioning parameter indicating a partitioning manner of the plurality of tiles in the picture, the tile parameter further including tile identifiers identifying each of plurality of tiles, wherein the data unit includes a data unit of a parameter set.

3. The method of claim 1, wherein the first address of the slice includes a coordinate of a location of a first sample of the slice in the picture.

4. The method of claim 1, wherein the second address includes a location of a first sample of the slice in the tile, a coordinate offset between the location of the first sample of the slice and a location of a first sample of the tile, or an ordering number of a first coding block of the slice in the tile.

5. The method of claim 1, wherein the one or more configurations include at least one parameter that differs in value, the at least one parameter including: a quantization parameter for the picture, a resolution of the picture, a quantization parameter for the plurality of tiles, or a resolution of the plurality of tiles.

6. A method for decoding a picture in video or picture processing, wherein the picture is partitioned into a plurality of tiles, and each of the plurality of tiles is partitioned into a plurality of slices, comprising:
obtaining a tile identifier from a header of a slice in a bitstream, wherein the tile identifier indicates a tile in which the slice resides;
obtaining a second address from the header of the slice in the bitstream, wherein the second address indicates a location of the slice in the tile; and
determining a first address of the slice indicating a location of the slice in the picture based on the tile identifier and the second address.

7. The method of claim 6, comprising:
obtaining a tile parameter from a data unit of the picture in the bitstream, wherein the tile parameter includes a tile partitioning parameter indicating a partitioning manner of the plurality of tiles, the tile parameter further includes tile identifiers identifying each of the plurality of tiles, wherein the data unit includes a data unit of a parameter set.

8. The method of claim 6, wherein the first address of the slice includes a coordinate of a location of a first sample of the slice in the picture.

9. The method of claim 6, wherein the second address includes a location of a first sample of the slice in the tile, a coordinate offset between the location of the first sample of the slice and a location of a first sample of the tile, or an ordering number of a first coding block of the slice in the tile.

10. The method of claim 9, wherein the ordering number of the first coding block of the slice is determined based on a scanning order of coding blocks, wherein the scanning order includes a raster scanning order.

11. An apparatus for video or picture processing, comprising:
a coder control unit configured to generate one or more configurations, and
an encoder configured to receive the one or more configurations from the coder control unit for generating one or more bitstreams,
wherein the encoder comprises:
a partition unit that is configured to partition a picture into a plurality of tiles and partition each of the plurality of tiles into a plurality of slices, the partition unit further configured to perform, for each slice among the plurality of slices:
determining a tile identifier that indicates a tile in which the slice resides, and
determining a second address of the slice that indicates a location of the slice in the tile, wherein the second address is determined based on a first address of the slice that indicates a location of the slice in the picture and an address of the tile.

12. The apparatus of claim 11, wherein the partition unit is configured to determine a tile parameter that includes a tile partitioning parameter indicating a partitioning manner of the plurality of tiles in the picture, the tile parameter further including tile identifiers identifying each of the plurality of tiles, wherein the encoder comprises an encoding unit configured to:
receive, from the partition unit, the tile parameter, the tile identifier for each of the plurality of slices, and the second address of the slice for each of the plurality of slices;
encode the tile parameter in a data unit of the picture,
encode the tile identifier in a header of each of the plurality of slices, and
encode the second address of the slice in the header of each of the plurality of slices, and wherein the data unit includes a data unit of a parameter set.

13. The apparatus of claim 11, wherein the first address of the slice includes a coordinate of a location of a first sample of the slice in the picture.

14. The apparatus of claim 11, wherein the second address includes a location of a first sample of the slice in the tile, a coordinate offset between the location of the first sample of the slice and a location of a first sample of the tile, or an ordering number of a first coding block of the slice in the tile.

15. The apparatus of claim 11, wherein the one or more configurations include at least one parameter that differs in value, the at least one parameter including: a quantization parameter for the picture, a resolution of the picture, a quantization parameter for the plurality of tiles, or a resolution of the plurality of tiles.

16. An apparatus for decoding a picture in video or picture processing, wherein the picture is partitioned into a plurality of tiles, and each of the plurality of tiles is partitioned into a plurality of slices, comprising a parsing unit configured to:
obtain a tile identifier from a header of a slice in a bitstream, wherein the tile identifier indicates a tile in which the slice resides;
obtain a second address from the header of the slice in the bitstream, wherein the second address indicates a location of the slice in the tile; and
determine a first address of the slice indicating a location of the slice in the picture based on the tile identifier and the second address.

17. The apparatus of claim 16, wherein the parsing unit is configured to:
obtain a tile parameter from a data unit of the picture in the bitstream, wherein the tile parameter includes a tile partitioning parameter indicating a partitioning manner of the plurality of tiles, the tile parameter further includes tile identifiers identifying each of the plurality of tiles, wherein the data unit includes a data unit of a parameter set.

18. The apparatus of claim 16, wherein the first address of the slice includes a coordinate of a location of a first sample of the slice in the picture.

19. The apparatus of claim 16, wherein the second address includes a location of a first sample of the slice in the tile, a coordinate offset between the location of the first sample of the slice and a location of a first sample of the tile, or an ordering number of a first coding block of the slice in the tile.

20. The apparatus of claim 19, wherein the ordering number of the first coding block of the slice is determined based on a scanning order of coding blocks, wherein the scanning order includes a raster scanning order.

* * * * *